(12) United States Patent
Yamagishi et al.

(10) Patent No.: US 10,110,972 B2
(45) Date of Patent: Oct. 23, 2018

(54) TRANSMITTING DEVICE, TRANSMITTING METHOD, RECEIVING DEVICE, AND RECEIVING METHOD

(71) Applicant: Saturn Licensing LLC, New York, NY (US)

(72) Inventors: Yasuaki Yamagishi, Kanagawa (JP); Masahito Mori, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/030,543

(22) PCT Filed: Sep. 4, 2014

(86) PCT No.: PCT/JP2014/073353
§ 371 (c)(1),
(2) Date: Apr. 19, 2016

(87) PCT Pub. No.: WO2015/064212
PCT Pub. Date: May 7, 2015

(65) Prior Publication Data
US 2016/0255417 A1 Sep. 1, 2016

(30) Foreign Application Priority Data
Oct. 30, 2013 (JP) ................... 2013-224902

(51) Int. Cl.
*H04N 21/8543* (2011.01)
*H04N 21/2343* (2011.01)
(Continued)

(52) U.S. Cl.
CPC ..... *H04N 21/8543* (2013.01); *H04L 65/4084* (2013.01); *H04N 21/2353* (2013.01);
(Continued)

(58) Field of Classification Search
CPC combination set(s) only.
See application file for complete search history.

(56) References Cited

U.S. PATENT DOCUMENTS 7,833,028 B1 11/2010 Huang et al.
2006/0040713 A1 2/2006 Kim
(Continued)

FOREIGN PATENT DOCUMENTS

CN 200994166 12/2007

OTHER PUBLICATIONS

3rd Generation Partnership Project; Technical Specification Group Services and System Aspects; 3rd Generation Partnership Project;Technical Specification Group Services and System Aspects; Multimedia Broadcast/Multicast Service (MBMS);Enhanced MBMS Operation (Release 12),3GPP TR 26.848 V0.5.1 (Sep. 2013).*

(Continued)

*Primary Examiner* — Mulugeta Mengesha
(74) *Attorney, Agent, or Firm* — Oblon, McClelland, Maier & Neustadt, L.L.P.

(57) ABSTRACT

This technology relates to a transmitting device, a transmitting method, a receiving device, and a receiving method capable of easily obtaining a mosaic screen.
Metadata described by using an attribute and an attribute value, the metadata of content including signaling information indicating that video is thumbnail video suitable for forming the mosaic screen and the attribute indicating minimum buffer time required before replay of the content starts is delivered. This technology may be applied when the content is delivered, for example.

16 Claims, 31 Drawing Sheets

(51) Int. Cl.

| | |
|---|---|
| *H04N 21/262* | (2011.01) |
| *H04N 21/431* | (2011.01) |
| *H04N 21/845* | (2011.01) |
| *H04N 21/235* | (2011.01) |
| *H04N 21/435* | (2011.01) |
| *H04N 21/44* | (2011.01) |
| *H04N 21/6405* | (2011.01) |
| *H04N 21/6408* | (2011.01) |
| *H04L 29/06* | (2006.01) |
| *H04N 21/61* | (2011.01) |

(52) U.S. Cl.
CPC ........... *H04N 21/23439* (2013.01); *H04N 21/234363* (2013.01); *H04N 21/26258* (2013.01); *H04N 21/435* (2013.01); *H04N 21/4314* (2013.01); *H04N 21/44004* (2013.01); *H04N 21/6125* (2013.01); *H04N 21/6131* (2013.01); *H04N 21/6405* (2013.01); *H04N 21/6408* (2013.01); *H04N 21/8456* (2013.01)

(56) References Cited

U.S. PATENT DOCUMENTS

2011/0273632 A1 11/2011 Casey
2015/0020102 A1* 1/2015 Yoo .................. H04N 21/23436
　　　　　　　　　　　　　　　　　　　　725/41
2015/0296269 A1* 10/2015 Tokumo ............... H04N 21/238
　　　　　　　　　　　　　　　　　　　　725/93

OTHER PUBLICATIONS

Universal Mobile Telecommunications System (UMTS);LTE;Transparent end-to-end Packet-switched Streaming Service (PSS); Progressive Download and Dynamic Adaptive Streaming over HTTP (3GP-DASH) (3GPP TS 26.247 version 10.2.0 Release 10)(ETSI TS 126 247 V10.2.0 (Jul. 2012)).*
3rd Generation Partnership Project; "Technical Specification Group Services and System Aspects"; Multimedia Broadcast/Multicast Service (MBMS); Enhanced MBMS Operation, Release 12, Nov. 2013, pp. 9, 3GPP TR 26.848 V0.5.1.
Mitsuhiro Hirabayashi, "Realizing the Uninterrupted Video Distribution in the Existing Web Server", MPEG-DASH, Nikkei Electronics, Mar. 19, 2012, pp. 21 (Including 12 Pages of English Translation).
Partial Supplementary European Search Report issued May 19, 2017 in Patent Application No. 14858180.4.
3GPP TS 26.247 V12.0.0 (Sep. 2013), 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 12), 3GPP Standard, vol. SA WG4, No. V12.0.0, XP50712355, Sep. 19, 2013, pp. 1-114.
3GPP TR 26.848 V0.5.1 (Sep. 2013), "3rd Generation Partnership Project; Technical Specification Group Services and System Aspects; Multimedia Broadcast/Multicast Service (MBMS); Enhanced MBMS Operation (Release 12)", 3GPP Draft, XP50727842, Sep. 27, 2013, pp. 1-26.
Chinese Office Action dated Nov. 28, 2016 in Patent Application No. 201280063408.2 (with English Translation).
Chinese Notification for Patent Registration Formalities dated Apr. 14, 2017 in Patent Application No. 201280063408.2 (with English Translation).
Extended European Search Report dated Aug. 17, 2017 in Patent Application No. 14858180.4.

* cited by examiner

FIG. 14

```
<MPD ... profiles= ... minBufferTime= ... >
  <Period ... >
    <AdaptationSet ... width=' 480' height=' 270' ... > ~141
      <ViewPoint schemeIdURI="urn:thumbnailVideo" /> ~142
      :
    </AdaptationSet>
    :
  </Period>
  :
</MPD>
```

FIG. 16

- Access
  - /@id,/@version — Access/@id,Access/@version
  - /AccessType — Access/AccessType
  - /BroadcastServiceDelivery — Access/AccessType/BroadcastServiceDelivery
    - /SessionDescription — Access/AccessType/BroadcastServiceDelivery/SessionDescription
      ≫ /USBDRef — Access/AccessType/BroadcastServiceDelivery/SessionDescription/USBDRef
  - /UnicastServiceDelivery — Access/AccessType/UnicastServiceDelivery
  - /ServiceClass — Access/ServiceClass

```
<MPD ...profiles= ... minBufferTime= ... >
  <Period ... >
                    141
    <AdaptationSet ... width=' 480'  height=' 270' ... > (AdaptationSet FOR Thumbnail Video)
      <ViewPoint schemeIdURI="urn:thumbnailVideo:dic" value=" X, Y, Z, ..." />
                                                                       201
      ...
    </AdaptationSet>
    ...
  </Period>
  ...
</MPD>
```

FIG. 25

```
<MPD ···profiles= ··· minBufferTime= ··· >
 <Period ··· >
                        141
  <AdaptationSet ··· width=' 480' height=' 270' ··· > (AdaptationSet FOR Thumbnail Video)
   <ViewPoint schemeIdURI="  urn:thumbnailVideo:dic" value=" baseball, US, CA" /> ~211
   <ViewPoint schemeIdURI="  urn:thumbnailVideo:JapaneseParameters" value=" BASEBALL, UNITED STATES OF AMERICA, CALIFORNIA" />
                                                                                  212
   ···
  </AdaptationSet>
  ···
 </Period>
 ···
</MPD>
```

FIG. 26

```
<MPD ...profiles= ... minBufferTime= ... >   141
  <Period ... >
    <AdaptationSet ... width=' 480' height=' 270' ... >   (AdaptationSet FOR Thumbnail Video)
      <ViewPoint schemeIdURI=" http://basebalIAuthority.com/thumbnailVideoGenre" value=" baseball, majorLeague" />
                                                                                      221
      ...
    </AdaptationSet>
    ...
  </Period>
  ...
</MPD>
```

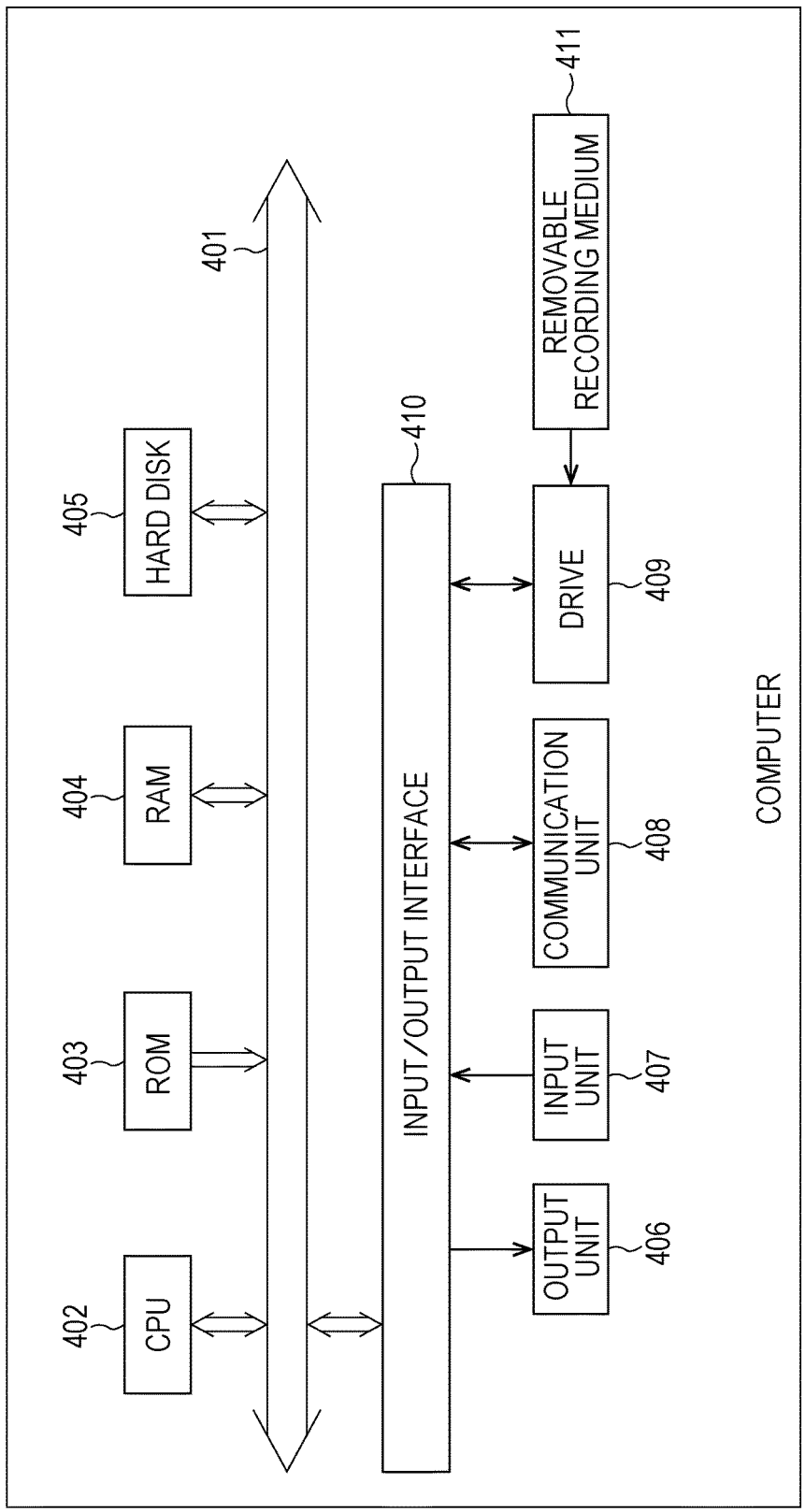

TRANSMITTING DEVICE, TRANSMITTING METHOD, RECEIVING DEVICE, AND RECEIVING METHOD

CROSS REFERENCE TO RELATED APPLICATIONS

This application is a U.S. National Phase of International Patent Application No. PCT/JP2014/073353 filed on Sep. 4, 2014, which claims priority benefit of Japanese Patent Application No. JP 2013-224902 filed in the Japan Patent Office on Oct. 30, 2013. Each of the above-referenced applications is hereby incorporated herein by reference in its entirety.

TECHNICAL FIELD

This technology relates to a transmitting device, a transmitting method, a receiving device, and a receiving method, and especially relates to the transmitting device, transmitting method, receiving device, and receiving method capable of easily obtaining a mosaic screen, for example.

BACKGROUND ART

Recently, Over The Top Video (OTT-V) is a mainstream of streaming services on the Internet. For example, Moving Picture Experts Group-Dynamic Adaptive Streaming over Hypertext Transfer Protocol (HTTP) (MPEG-DASH) (herein, also referred to as DASH) starts becoming popular as base technology of the OTT-V.

In the DASH, for example, a server which delivers a stream notifies a client which receives the stream of Media Presentation Description (MPD) as metadata including attribute information for optimally selecting streams with different properties from the same source, and the client uses the MPD, thereby realizing network environment adaptive streaming (refer to Non-Patent Document 1, for example).

That is to say, in the DASH, the server prepares a plurality of streams with different image qualities and image sizes of content including the same contents according to a communication environment of a delivery path and ability and status of the client.

On the other hand, the client adaptively selects the stream suitable for the ability (decoding ability and the like) of the client which the client may receive out of a plurality of streams prepared by the server and receives the stream to replay.

In the DASH, the metadata used for replay control of the content referred to as the MPD is delivered from the server to the client such that the client may adaptively select to receive the stream.

A Uniform Resource Locator (URL) and the like as an address of a segment (media data such as Audio/Video/Subtitle) obtained by dividing the content is described in the MPD. The client transmits a HTTP request to a web server from which the content is delivered based on the URL and the like described in the MPD and receives the segment which the web server unicast-delivers according to the HTTP request to replay.

CITATION LIST

Non-Patent Document

Non-Patent Document 1: "Realization of Continuous Moving Image Delivery Using Existing Web Server", Mitsuhiro Hirabayashi, NIKKEI ELECTRONICS, Mar. 19, 2012

SUMMARY OF THE INVENTION

Problems to be Solved by the Invention

It is convenient that a client displays a mosaic screen on which videos of a plurality of contents are arranged in a lattice pattern when viewing a live broadcasting content, for example, and a user may select a channel (content) to be viewed while watching the videos of a plurality of contents displayed on the mosaic screen.

However, in current DASH, useful information for generating the mosaic screen is not delivered to the client, so that it is difficult to easily obtain the mosaic screen.

This technology is achieved in view of such a condition and an object thereof is to easily obtain the mosaic screen.

Solutions to Problems

A transmitting device of this technology is a transmitting device including a delivering unit which delivers metadata described by using an attribute and an attribute value, the metadata of content including signaling information indicating that video is thumbnail video suitable for forming a mosaic screen and the attribute indicating minimum buffer time required before replay of the content starts.

A transmitting method of this technology is a transmitting method including a step of delivering metadata described by using an attribute and an attribute value, the metadata of content including signaling information indicating that video is thumbnail video suitable for forming a mosaic screen and the attribute indicating minimum buffer time required before replay of the content starts.

In the above-described transmitting device and transmitting method of this technology, the metadata described by using the attribute and attribute value, the metadata of the content including the signaling information indicating that the video is the thumbnail video suitable for forming the mosaic screen and the attribute indicating the minimum buffer time required before the replay of the content starts is delivered.

A receiving device of this technology is a receiving device including a receiving unit which receives metadata described by using an attribute and an attribute value, the metadata of content including signaling information indicating that video is thumbnail video suitable for forming a mosaic screen and the attribute indicating minimum buffer time required before replay of the content starts.

A receiving method of this technology is a receiving method including a step of receiving metadata described by using an attribute and an attribute value, the metadata of content including signaling information indicating that video is thumbnail video suitable for forming a mosaic screen and the attribute indicating minimum buffer time required before replay of the content starts.

In the above-described receiving device and receiving method of this technology, the metadata described by using the attribute and attribute value, the metadata of the content including the signaling information indicating that the video is the thumbnail video suitable for forming the mosaic screen and the attribute indicating the minimum buffer time required before the replay of the content starts is received.

Meanwhile, the transmitting device and receiving device may be independent devices or may be internal blocks which form one device.

Effects of the Invention

According to this technology, the mosaic screen may be easily obtained.

Meanwhile, the effect is not necessarily limited to that herein described and may be any effect described in this disclosure.

BRIEF DESCRIPTION OF DRAWINGS

FIG. 14 is a view illustrating an example of the MPD as the thumbnail metadata described in XML.

FIG. 16 is a view illustrating an example of the element and attribute of XML composing the OMA-ESG as the thumbnail metadata described in XML.

FIG. 23 is a view illustrating a first example of the MPD as the thumbnail metadata into which content description metadata is introduced.

FIG. 25 is a view illustrating a second example of the MPD as the thumbnail metadata into which the content description metadata is introduced.

FIG. 26 is a view illustrating a third example of the MPD as the thumbnail metadata into which the content description metadata is introduced.

FIG. 31 is a block diagram illustrating a configuration example of one embodiment of a computer to which this technology is applied.

MODE FOR CARRYING OUT THE INVENTION

<One Embodiment of Content Providing System to which this Technology is Applied>

Figure 1:
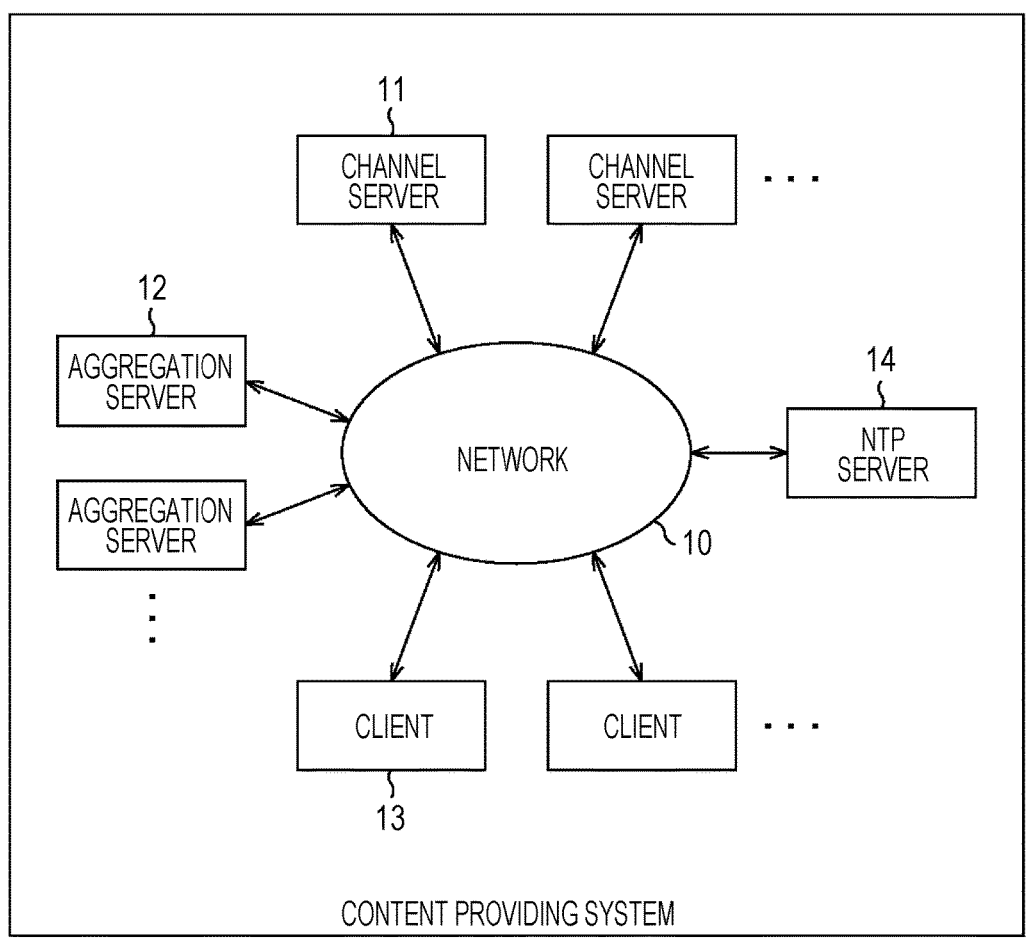
FIG. 1 is a block diagram illustrating a configuration example of one embodiment of a content providing system to which this technology is applied.

FIG. 1 is a block diagram illustrating a configuration example of one embodiment of a content providing system to which this technology is applied.

In FIG. 1, the content providing system is configured such that a plurality of channel servers 11, one or more aggregation servers 12, one or more clients 13, and a Network Time Protocol (NTP) server 14 are connected to a network 10.

In the content providing system in FIG. 1, content is provided from the channel servers 11 and aggregation server 12 to the client 13 through the network 10 by using DASH.

Herein, although it is supposed that streaming itself is performed by unicasting over Over The Top/Contents Delivery Network (OTT/CDN) in current DASH, video forming a mosaic screen is delivered over a multicast network (eMBMS and the like) capable of broadcasting quality of which is certified on a portable network, for example, in the content providing system in FIG. 1. According to this, operational feeling of selecting a channel by using the mosaic screen excellent in performance is provided to a large number of users.

That is to say, the content providing system in FIG. 1 makes it possible that the client 13 easily and efficiently generates (obtains) the mosaic screen by grouping (aggregating) a plurality of videos forming the mosaic screen and delivering the same in one FLUTE multicast session and the like.

The network 10 includes a point-to-point network such as the Internet capable of unicasting and multicasting and a broadcast network capable of broadcasting and multicasting. Multimedia Broadcast Multicast Service (MBMS) (including eMBMS (evolved MBMS) of 3rd Generation Partnership Project (3GPP) and the like may be adopted, for example, as the network 10.

The channel server 11 corresponding to a broadcast station, for example, delivers a plurality of streams of the same content with different bit rates and image sizes through the network 10 as a program of a channel (service) of the broadcast station.

Herein, a plurality of streams delivered by the channel server 11 includes the streams of main video, audio, and subtitles to be viewed and the stream of thumbnail video suitable for forming the mosaic screen.

Herein, the thumbnail video suitable for forming the mosaic screen is intended to mean the video of the same content as that of the main video, the video having a predetermined image size smaller than that of the main video, for example; a plurality thereof is tiled on a display screen of a certain size in a lattice pattern and the like to form the mosaic screen.

The aggregation server 12 corresponding to a broadcast station which broadcasts the mosaic screen as a program, for example, groups (aggregates) a plurality of (streams of) thumbnail video delivered by a plurality of channel servers 11 and delivers the same through the network 10 as a program of a channel (screen) of the broadcast station.

The client 13 receives the main video and the like delivered by the channel server 11 and the thumbnail video delivered by the aggregation server 12 to replay.

The NTP server 14 provides NTP time being time information according to a Coordinated Universal Time (UTC) time format through the network 10.

The channel server 11, aggregation server 12, and client 13 may operate in synchronization with the NTP time provided from the NTP server 14.

Meanwhile, the program delivered by the channel server 11 (eventually, the program delivered by the aggregation server 12, too) may be a program in real time (live program) or a prerecorded program.

<Configuration Example of Channel Server 11>

Figure 2:
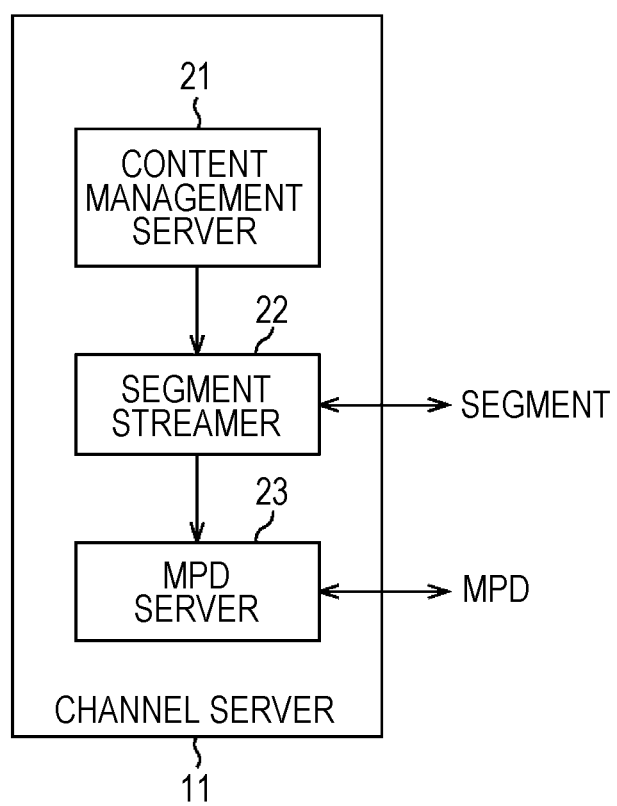
FIG. 2 is a block diagram illustrating a configuration example of a channel server 11.

FIG. 2 is a block diagram illustrating a configuration example of the channel server 11 in FIG. 1.

In FIG. 2, the channel server 11 includes a content management server 21, a segment streamer 22, and an MPD server 23.

Herein, the content management server 21, segment streamer 22, and MPD server 23 may be arranged in one place on the network 10 or may be arranged on the network 10 in a distributed manner. When the content management server 21, segment streamer 22, and MPD server 23 are arranged on the network 10 in a distributed manner, they may communicate with one another through a dedicated line and any other communication line in addition to the network 10.

The content management server 21 manages the video, audio, subtitles and the like as source data of the content to be delivered as the program of the channel of the channel server 11 and this generates a plurality of streaming data with different bit rates from the video and the like as the source data of the content to supply to the segment streamer 22.

Herein, a plurality of streaming data regarding the video includes the main video and thumbnail video.

The segment streamer 22 generates a segment stream of segments obtained by dividing each streaming data from the content management server 21 in a time direction.

That is to say, the segment streamer 22 divides the streaming data into fragments (moof and mdat) of fragmented MP4, for example, and collects one or more of the fragments to generate a file of the segment.

The segment streamer 22 supplies metadata of the segment required for generating MPD such as a URL of the segment (URL of the server which provides the segment (for example, the channel server 11) to the MPD server 23.

Furthermore, the segment streamer 22 performs HTTP unicast delivery of (the file of) the segment requested by a HTTP request according to the HTTP request as the request for the segment from the client 13 to the client 13 through the network 10 as a web server.

The segment streamer 22 delivers the segment of the thumbnail video to the aggregation server 12 (by unicasting or multicasting) through the network 10.

The MPD server 23 generates the MPD in which the URL of the segment and the like is described required for the client 13 to receive the segment and perform replay control by using the metadata of the segment supplied from the segment streamer 22.

The MPD server 23 performs the HTTP unicast delivery of the MPD to the client 13 through the network 10 according to the HTTP request as the request for the MPD from the client 13 as the web server.

The MPD server 23 delivers the MPD of the thumbnail video to the aggregation server 12 (by unicasting or multicasting) through the network 10.

Herein, the client 13 may request the MPD from the MPD server 23, thereby receiving the MPD which the MPD server 23 delivers by the HTTP unicast delivery according to the request.

The client 13 may request the segment from the segment streamer 22 based on the MPD from the MPD server 23, thereby receiving the segment which the segment streamer 22 delivers by the HTTP unicast delivery according to the request and furthermore replaying the segment based on the MPD.

<Configuration Example of Aggregation Server 12>

Figure 3:
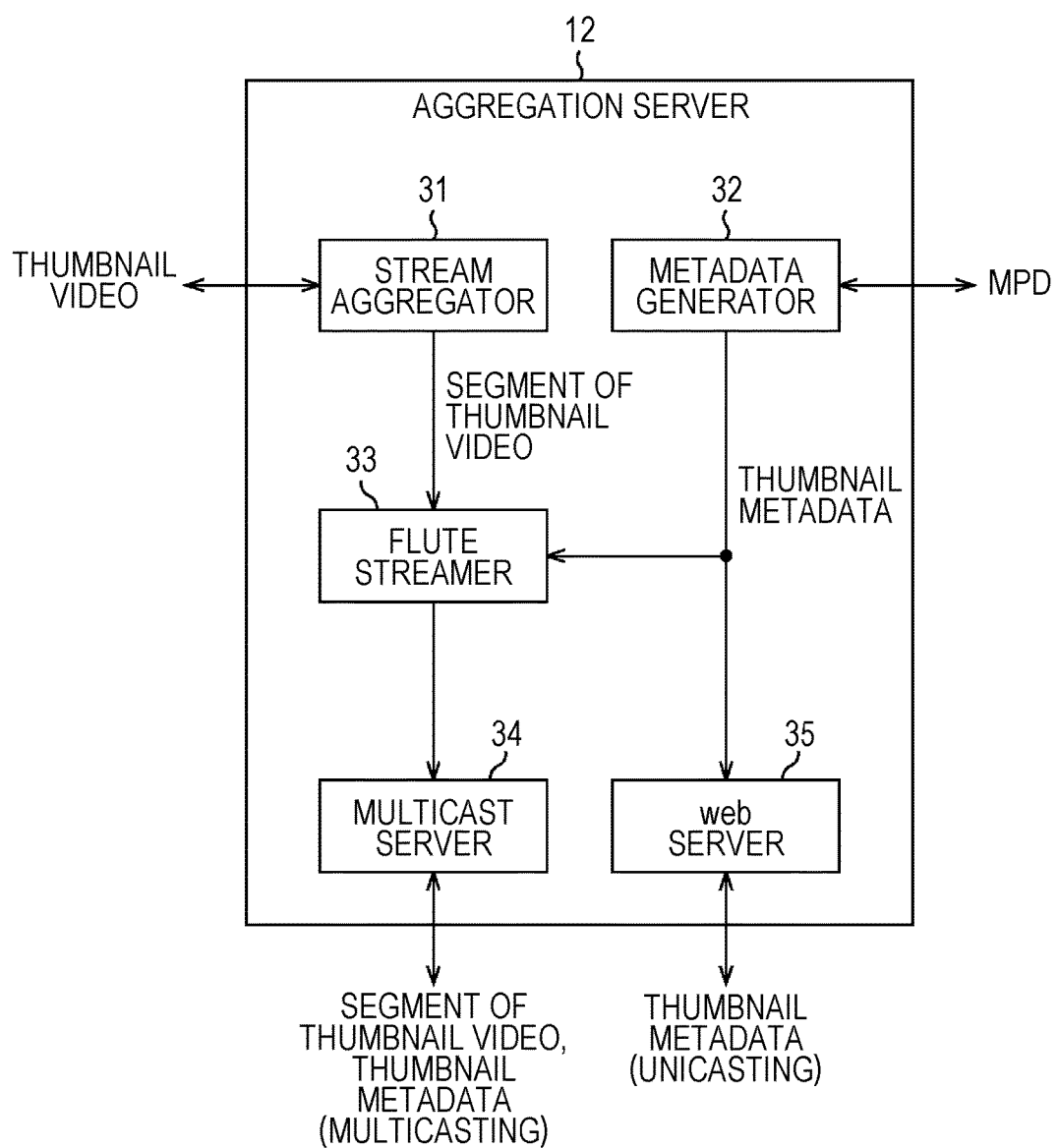
FIG. 3 is a block diagram illustrating a configuration example of an aggregation server 12.

FIG. 3 is a block diagram illustrating a configuration example of the aggregation server 12 in FIG. 1.

In FIG. 3, the aggregation server 12 includes a stream aggregator 31, a metadata generator 32, a File Delivery over Unidirectional Transport (FLUTE) streamer 33, a multicast server 34, and a web server 35.

Herein, the units from the stream aggregator 31 to web server 35 may be arranged in one place on the network 10 or arranged on the network 10 in a distributed manner as with the channel server 11 in FIG. 2. When the units from the stream aggregator 31 to web server 35 are arranged on the network 10 in a distributed manner, they may communicate with one another through a dedicated line and any other communication line in addition to the network 10.

The stream aggregator 31 selects (aggregates) two or more thumbnail videos which form a certain channel of the mosaic screen (hereinafter, also referred to as a mosaic channel) out of a plurality of (segments of) thumbnail videos delivered from a plurality of channel servers 11 as thumbnail videos for mosaic channel and supplies the same to the FLUTE streamer 33.

Herein, the stream aggregator 31 selects two or more thumbnail videos suitable for forming one mosaic screen out of a plurality of thumbnail videos delivered from a plurality of channel servers 11 as the thumbnail videos for mosaic channel.

The two or more thumbnail videos suitable for forming one mosaic screen are two or more thumbnail videos at least having the same image size, for example.

In addition, the stream aggregator 31 may make it conditions that the image size is suitable for tiling in a lattice pattern and the like on the display screen of a certain size and that the videos are of the same genre such as a live broadcast of a baseball game, for example, and select two or more thumbnail videos satisfying one or more of the conditions as the thumbnail videos for mosaic channel.

The metadata generator 32 selects the MPD for each of the two or more thumbnail videos selected by the stream aggregator 31 out of the MPD of a plurality of thumbnail videos delivered from a plurality of channel servers 11 and generates thumbnail metadata being metadata for mosaic channel by using the MPD.

The metadata generator 32 supplies the thumbnail metadata to the FLUTE streamer 33 and web server 35.

Herein, a combination of User Service Description (USD) of the MBMS, the MPD of the DASH, and Session Description Protocol (SDP) file of Internet Engineering Task Force (IETF) or a combination of Open Mobile Alliance-Electronic Service Guide (OMA-ESG), the USD, MPD, and SDP may be utilized, for example, as the thumbnail metadata.

The OMA-ESG, USD, MPD, and SDP are described by using an attribute (name) and an attribute value set in the attribute. The attribute and attribute value are also sometimes referred to as a key and a value, for example.

The FLUTE streamer 33 stores (the segment of) the thumbnail video supplied from the stream aggregator 31 in a FLUTE packet, that is to say, a Layered Coding Transport (LCT) packet (Asynchronous Layered Coding (ALC) packet) and supplies the same to the multicast server 34.

The FLUTE streamer 33 also stores the thumbnail metadata supplied from the metadata generator 32 in the LCT packet to supply to the multicast server 34.

The multicast server 34 performs FLUTE multicast delivery of the LCT packet from the FLUTE streamer 33 through the network 10.

Herein, since (the segment of) the thumbnail video and the thumbnail metadata are stored in the LCT packet from the FLUTE streamer 33 as described above, the thumbnail video and thumbnail metadata are multicast-delivered by the multicast server 34.

The web server 35 performs the HTTP unicast delivery of the thumbnail metadata from the metadata generator 32 to the client 13 through the network 10 according to the request (HTTP request) from the client 13.

Herein, as described above, the multicast server 34 and web server 35 serve as delivering units which deliver the thumbnail metadata.

Meanwhile, although the thumbnail video is multicast-delivered as described above by the aggregation server 12 in FIG. 3, the aggregation server 12 may also obtain (the segment of) the main video, audio, and subtitles about the content of the thumbnail video from the channel server 11 to multicast-deliver as is the case with the thumbnail video.

The channel server 11 may multicast-deliver the main video and the like as the aggregation server 12 multicast-delivers the thumbnail video.

Furthermore, in the aggregation server 12, the multicast server 34 may multicast-deliver the thumbnail video and the web server 35 may unicast-deliver the same.

<Configuration Example of Client 13>

Figure 4:
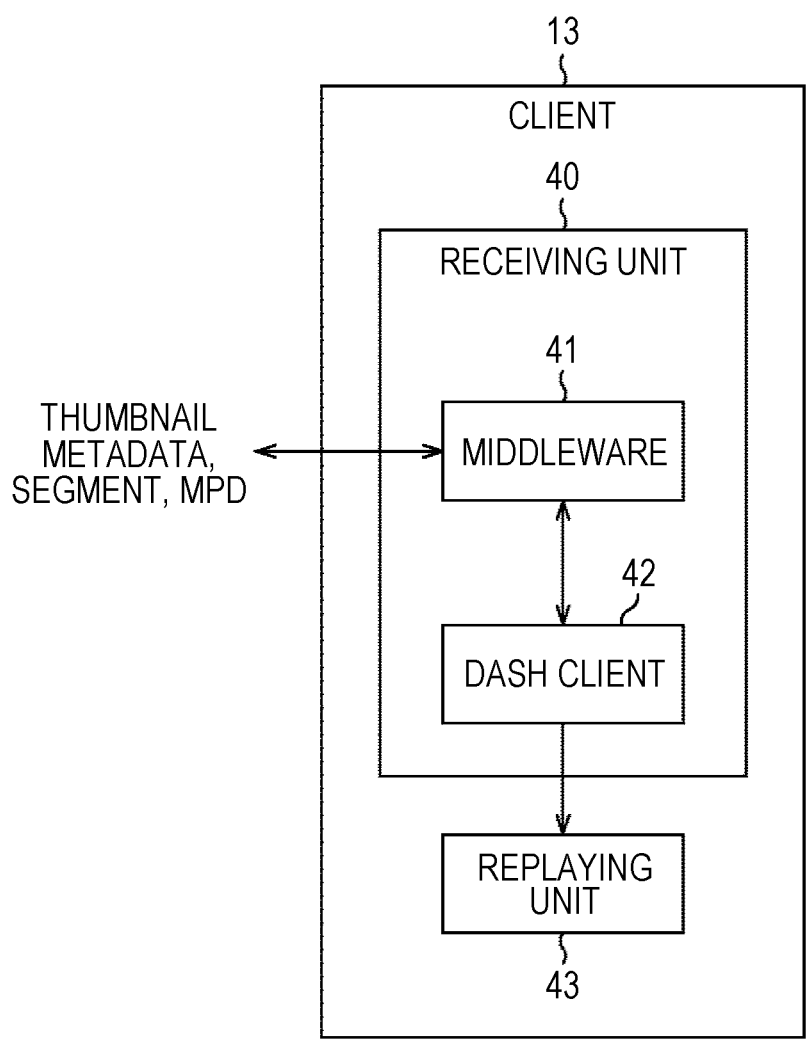
FIG. 4 is a block diagram illustrating a configuration example of a client 13.

FIG. 4 is a block diagram illustrating a configuration example of the client 13 in FIG. 1.

In FIG. 4, the client 13 includes a receiving unit 40 and a replaying unit 43.

The receiving unit 40 serves as a receiving unit which receives the MPD delivered from the channel server 11 and the thumbnail metadata delivered from the aggregation server 12 according to operation and the like of the client 13 by the user, for example.

The receiving unit 40 receives the segment (of the main video and the like) delivered from the channel server 11 and the segment (of the thumbnail video and the like) multicast-delivered from the aggregation server 12 based on the MPD received from the channel server 11 and the thumbnail metadata received from the aggregation server 12 according to the operation and the like of the client 13 by the user, for example.

Furthermore, the receiving unit 40 supplies the segments received from the channel server 11 and aggregation server 12 to the replaying unit 43 and controls replay of the segment by the replaying unit 43 based on the MPD received from the channel server 11 and the thumbnail metadata received from the aggregation server 12.

The replaying unit 43 replays the segment supplied from the receiving unit 40, that is to say, the mosaic screen formed of the thumbnail videos, main video, audio, subtitles and the like according to control of the receiving unit 40.

Herein, the receiving unit 40 includes middleware 41 and a DASH client 42.

The DASH client 42 outputs the HTTP request to request the MPD and the segment of the thumbnail video, main video and the like to the middleware 41 as needed.

The middleware 41 receives the MPD, thumbnail metadata, and segment which are multicast-delivered as needed, and when the DASH client 42 outputs the HTTP request, this determines whether the MPD and segment requested by the HTTP request are multicast-delivered based on the thumbnail metadata and the like.

When the MPD and segment requested by the HTTP request output by the DASH client 42 are multicast-delivered, the middleware 41 receives the MPD and segment which are multicast-delivered to supply to the DASH client 42.

Meanwhile, when the MPD and segment requested by the HTTP request output by the DASH client 42 are already received, the middleware 41 supplies the received MPD and segment to the DASH client 42.

On the other hand, when the MPD and segment requested by the HTTP request output by the DASH client 42 are not multicast-delivered, the middleware 41 transmits the HTTP request output by the DASH client 42 as-is to the network 10. Then, the middleware 41 receives the MPD and segment which are unicast-delivered according to the HTTP request to supply to the DASH client 42.

Therefore, the DASH client 42 outputs the HTTP request to request necessary MPD and segment as a general DASH client and receives the MPD and segment supplied from the middleware 41 according to the HTTP request to process.

<Process of Content Providing System>

Figure 5:
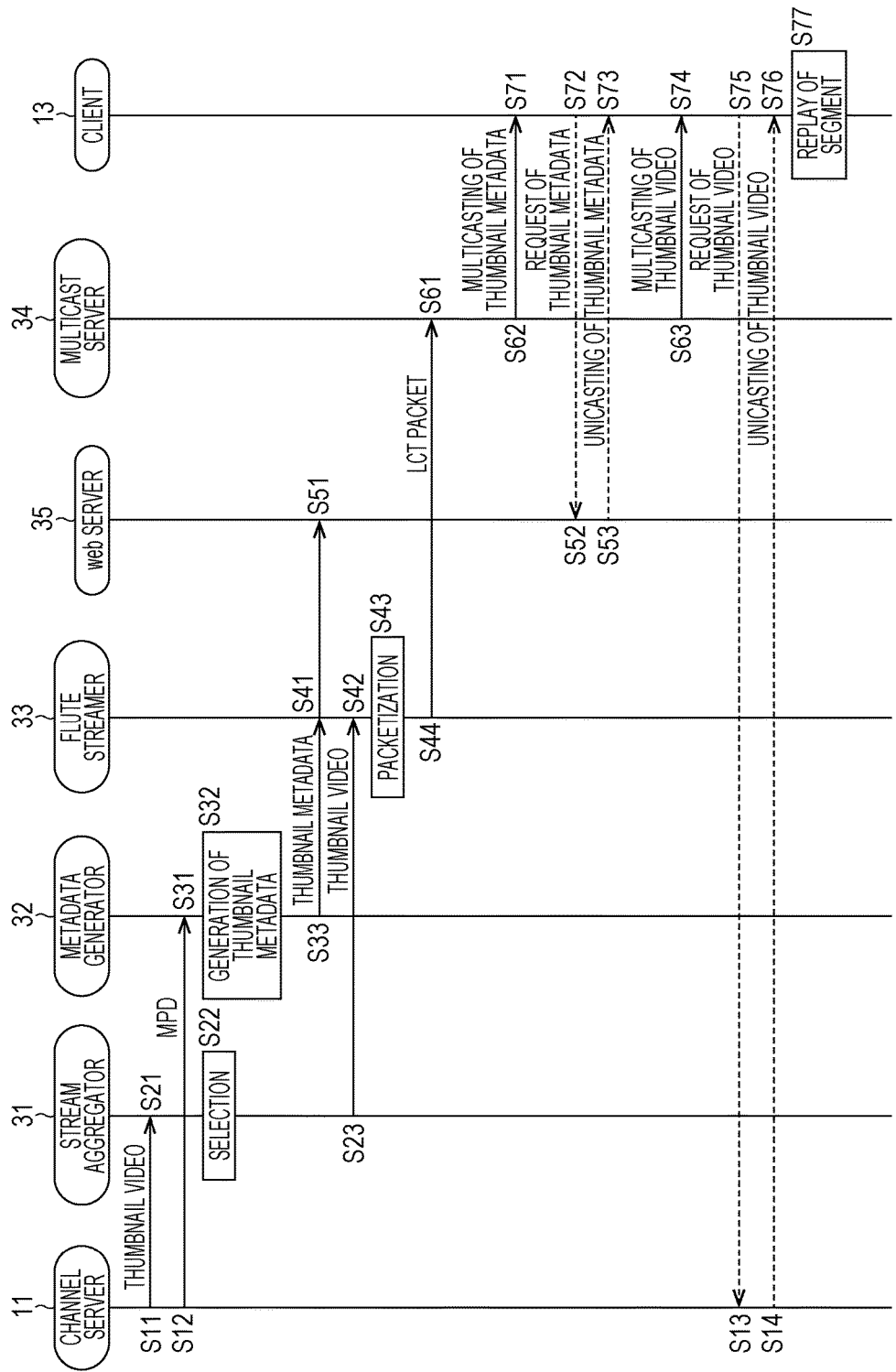
FIG. 5 is a view illustrating a process of providing thumbnail video by the content providing system.

FIG. 5 is a view illustrating an example of a process of providing the thumbnail video by the content providing system in FIG. 1.

The channel server 11 delivers the thumbnail video to the stream aggregator 31 of the aggregation server 12 (FIG. 3) at step S11.

Furthermore, the channel server 11 delivers the MPD of the thumbnail video to the metadata generator 32 of the aggregation server 12 at step S12.

When the HTTP request to request the thumbnail video is transmitted from the client 13, the channel server 11 receives the HTTP request at step S13.

The channel server 11 unicast-delivers (the segment of) the thumbnail video requested by the HTTP request from the client 13 to the client 13 at step S14.

At step S21, the stream aggregator 31 of the aggregation server 12 (FIG. 3) receives the thumbnail videos delivered by a plurality of channel servers 11 at step S11.

The stream aggregator 31 selects the two or more thumbnail videos which form the mosaic channel out of a plurality of thumbnail videos received from a plurality of channel servers 11 at step S22 and supplies the same to the FLUTE streamer 33 at step S23.

At step S31, the metadata generator 32 of the aggregation server 12 receives the MPD of the thumbnail videos delivered by a plurality of channel servers 11 at step S12.

The metadata generator 32 selects the MPD for each of the two or more thumbnail videos selected by the stream aggregator 31 out of the MPD of a plurality of thumbnail videos received from a plurality of channel servers 11 and generates the thumbnail metadata by using the MPD at step S32. Furthermore, the metadata generator 32 supplies the thumbnail metadata to the FLUTE streamer 33 and web server 35 at step S33.

At step S41, the FLUTE streamer 33 of the aggregation server 12 receives the thumbnail metadata supplied from the metadata generator 32 at step S33.

Furthermore, at step S42, the FLUTE streamer 33 receives (the segment of) the thumbnail video supplied from the stream aggregator 31 at step S23.

The FLUTE streamer 33 stores the thumbnail metadata from the metadata generator 32 and the thumbnail video from the stream aggregator 31 in the LCT packet to packetize them at step S43 and supplies the same to the multicast server 34 at step S44.

At step S51, the web server 35 of the aggregation server 12 receives the thumbnail metadata supplied from the metadata generator 32 at step S33.

When the HTTP request to request the thumbnail metadata is transmitted from the client 13, the web server 35 receives the HTTP request at step S52.

The web server 35 unicast-delivers the thumbnail metadata requested by the HTTP request from the client 13 to the client 13 at step S53.

At step S61, the multicast server 34 of the aggregation server 12 receives the LCT packet supplied from the FLUTE streamer 33 at step S44.

The multicast server 34 multicast-delivers the LCT packet in which the thumbnail metadata is stored from the FLUTE streamer 33 at step S62.

Furthermore, the multicast server 34 multicast-delivers the LCT packet in which the thumbnail video is arranged from the FLUTE streamer 33 at step S63.

In the client 13 (FIG. 4), the receiving unit 40 receives (the LCT packet of) the thumbnail metadata multicast-delivered by the multicast server 34 at step S62 at step S71.

Alternatively, in the client 13, the receiving unit 40 transmits the HTTP request to request the thumbnail metadata at step S72.

The web server 35 receives the HTTP request transmitted by the client 13 at step S72 at step S52 and unicast-delivers the thumbnail metadata requested by the HTTP request to the client 13 at step S53 as described above.

The receiving unit 40 of the client 13 receives the thumbnail metadata which is unicast-delivered in the above-described manner at step S73.

The receiving unit 40 of the client 13 receives (the LCT packet of) the thumbnail video which is multicast-delivered by the multicast server 34 at step S63 based on the thumbnail metadata at step S74.

Alternatively, in the client 13, the receiving unit 40 transmits the HTTP request to request the thumbnail video based on the thumbnail metadata at step S75.

The channel server 11 receives the HTTP request transmitted by the client 13 at step S75 at step S13 and unicast-delivers the thumbnail video requested by the HTTP request to the client 13 at step S14 as described above.

The receiving unit 40 of the client 13 receives the thumbnail video which is unicast-delivered in the above-described manner at step S76.

The replaying unit 43 of the client 13 replays (a plurality of) thumbnail videos received by the receiving unit 40 at step S74 or S76 and displays the mosaic screen on which the thumbnail videos are arranged in a lattice pattern at step S77.

The user of the client 13 may watch the mosaic screen to easily select the channel corresponding to the thumbnail video forming the mosaic screen as a viewing target.

<Description of Data Delivered Through Network 10>

Figure 6:
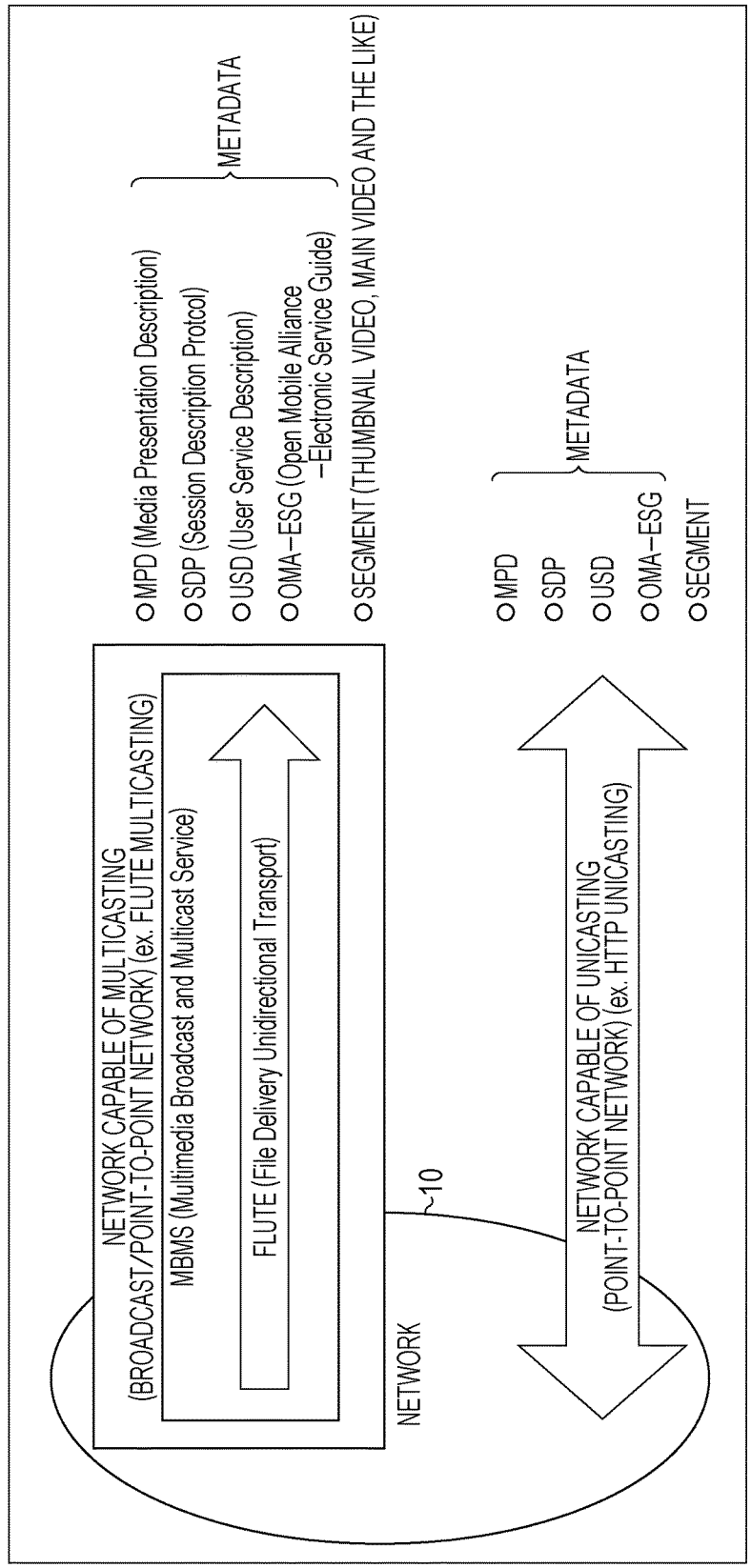
FIG. 6 is a view illustrating an example of data delivered through a network 10 in the content providing system.

FIG. 6 is a view illustrating an example of the data delivered through the network 10 in the content providing system in FIG. 1.

In the content providing system, the metadata such as the MPD, SDP, USD, and OMA-ESG and the segment of the thumbnail video, main video and the like are delivered to the client 13.

The metadata and segment may be multicast-delivered or unicast-delivered.

The combination of the MPD, SDP, and USD and the combination obtained by adding the OMA-ESG to the same are used as the thumbnail metadata.

Figure 7:
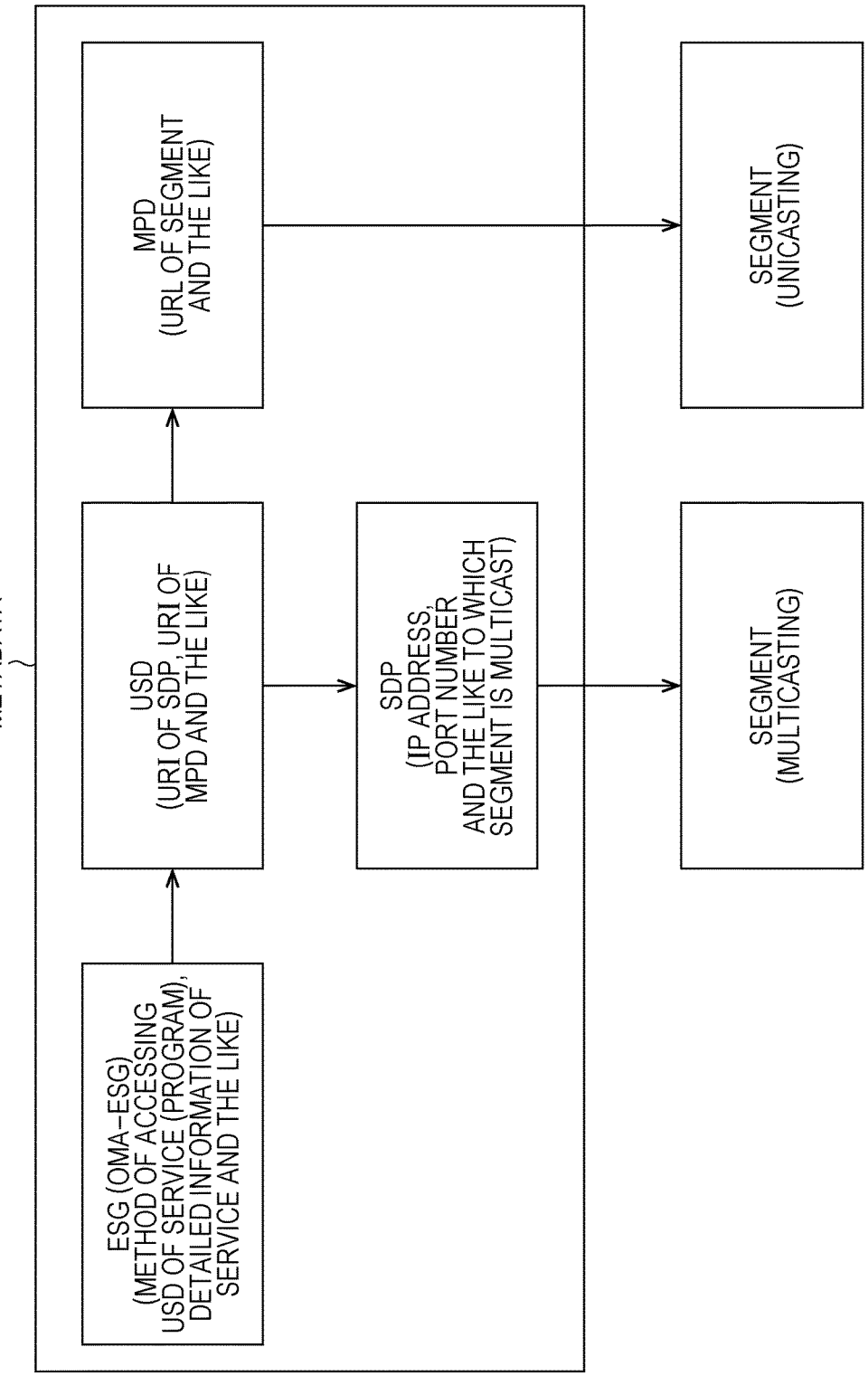
FIG. 7 is a view illustrating MPD, SDP, USD, and OMA-ESG.

FIG. 7 is a view illustrating the MPD, SDP, USD, and OMA-ESG.

If a certain program is set as a program of interest, detailed information of the program of interest, a method of accessing the USD of the program of interest and the like are described in the OMA-ESG of the program of interest.

Therefore, when the OMA-ESG of the program of interest is obtained, it is possible to obtain the USD of the program of interest by referring to the method of accessing the USD described in the OMA-ESG.

A Uniform Resource Identifier (URI) of the SDP of the program of interest, the URI of the MPD of the program of interest and the like are described in the USD of the program of interest.

Therefore, when the USD of the program of interest is obtained, it is possible to obtain the SDP and MPD of the program of interest by referring to the URI of the SDP and MPD described in the USD.

A transport attribute and the like such as an IP address and a port number to which the segment of the program of interest is multicast-delivered is described in the SDP of the program of interest.

Therefore, it is possible to receive the segment of the program of interest which is multicast-delivered based on the IP address and port number described in the SDP by obtaining the SDP of the program of interest.

The URL of the segment of the program of interest, information required for the replay control of the segment and the like are described in the MPD of the program of interest.

Therefore, it is possible to receive the segment of the program of interest by unicasting based on the URL described in the MPD by obtaining the MPD of the program of interest. It is also possible to replay the segment of the program of interest based on the MPD of the program of interest.

That is to say, since the information required for the replay control of the segment is included in the MPD, the MPD is required for receiving the segment by unicasting and for replaying the segment.

<Announcement of Thumbnail Video>

It is necessary that the client 13 know (recognize) which video is the thumbnail video in order for the client 13 (FIG. 1) to receive the thumbnail video and form the mosaic screen formed of a plurality of thumbnail videos.

Therefore, in the content providing system in FIG. 1, the aggregation server 12 announces the thumbnail video for allowing the client 13 to know which video is the thumbnail video.

The thumbnail video is announced by delivery of the thumbnail metadata including thumbnail signaling information indicating that the video is the thumbnail video.

Herein, the thumbnail signaling information may be included in the USD, MPD, and OMA-ESG as the thumbnail metadata.

The aggregation server 12 may deliver the thumbnail metadata including the thumbnail signaling information through an interaction channel (unicasting over ptp (point-to-point) bearer) and a broadcast multicast channel (broad/multicasting over point-to-multipoint (ptm) bearer) of the MBMS, for example.

That is to say, the aggregation server 12 may deliver the thumbnail metadata by FLUTE multicasting (over the broadcast network (also including the multicast network on the point-to-point network) and HTTP unicasting (over the point-to-multipoint network) as illustrated in FIG. 3.

A case of delivering the thumbnail metadata by using the MBMS being a mobile broadcast system on the portable network is hereinafter described.

Figure 8:
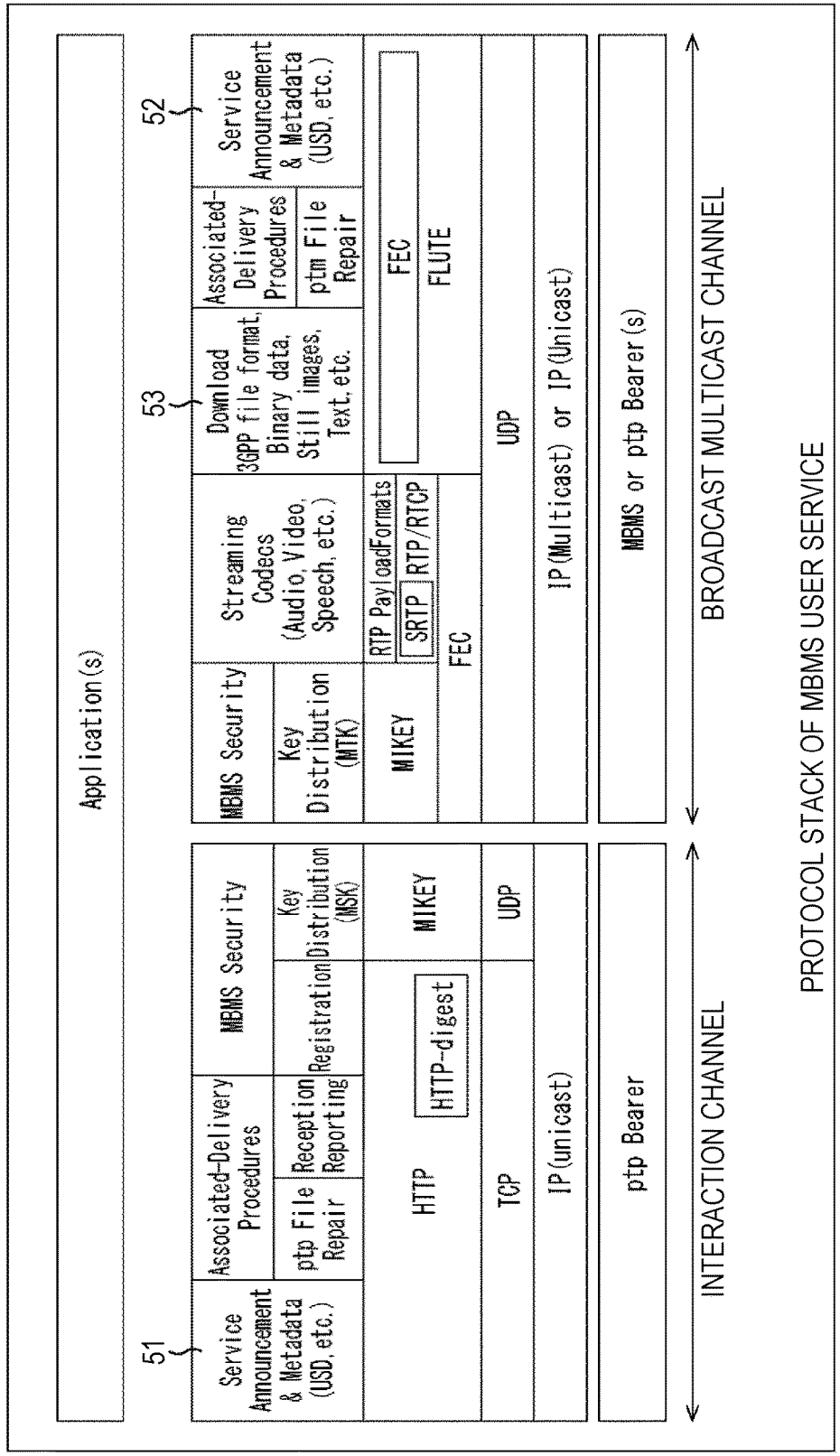
FIG. 8 is a view illustrating a protocol stack of MBMS.

FIG. 8 is a view illustrating a protocol stack of the MBMS.

The MBMS includes the interaction channel of point-to-point communication and the broadcast multicast channel of point-to-multipoint communication.

The interaction channel of the MBMS is utilized for the HTTP unicast delivery of the segment and the metadata such as the MPD (including the MPD and the like as the thumbnail metadata). The broadcast multicast channel of the MBMS is utilized for the FLUTE multicast delivery of the segment and the metadata such as the MPD.

Any one of the MPD, USD, MPD, and OMA-ESG as the thumbnail metadata may be delivered as Service Announcement & Metadata 51 of the interaction channel and Service Announcement & Metadata 52 of the broadcast multicast channel.

Meanwhile, when the segment is multicast-delivered, the segment is delivered by the FLUTE multicast delivery as Download 3GPP file format, Binary data, Still images, Text, etc. 53 of the broadcast multicast channel.

<USD as Thumbnail Metadata>

Figure 9:
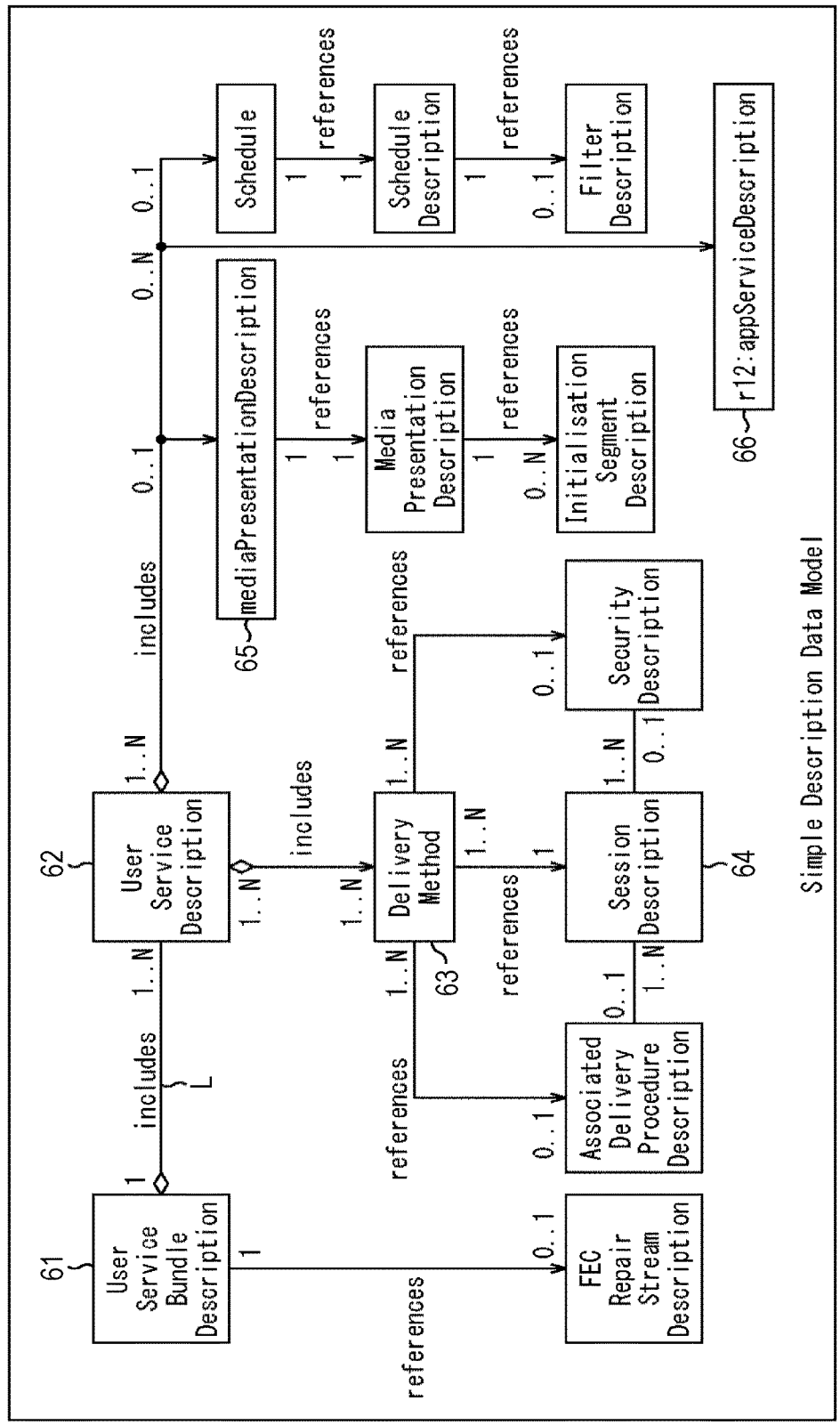
FIG. 9 is a view illustrating an example of a data model of the USD as thumbnail metadata.

FIG. 9 is a view illustrating an example of a data model of the USD as the thumbnail metadata.

In the data model of the thumbnail metadata in FIG. 9, r12:appServiceDescription (element) 66 is newly introduced into the data model of the USD of the MBMS.

In FIG. 9, User Service Bundle Description 61 is a root element and User Service Description 62 is information regarding the service. Delivery Method 63 being information regarding a method of delivering the segment includes the URI of Session Description 64 indicating the SDP and the like. The session Description 64 indicates the SDP and media Presentation Description 65 indicates the MPD.

The r12:appServiceDescription 66 is information for signaling whether (the segment of) the content provided by the service (broadcast station) (channel) is multicast-delivered (or broadcast-delivered) or unicast-delivered to the client 13.

Herein, in FIG. 9, for example, description "1 . . . N" on a side of the User Service Description 62 of a link (line) L connecting the User Service Bundle Description 61 and User Service Description 62 indicates that the User Service Bundle Description 61 on the side opposite to the description "1 . . . N" of the link L includes (or refers to) one to N User Service Descriptions 62.

Description "1" on the side of the User Service Bundle Description 61 of the link L indicates that the User Service Description 62 on the opposite side of the description "1" of the link L is included in (or referred to by) one User Service Bundle Description 61.

The same applies in FIG. 15 to be described later.

Figure 10:
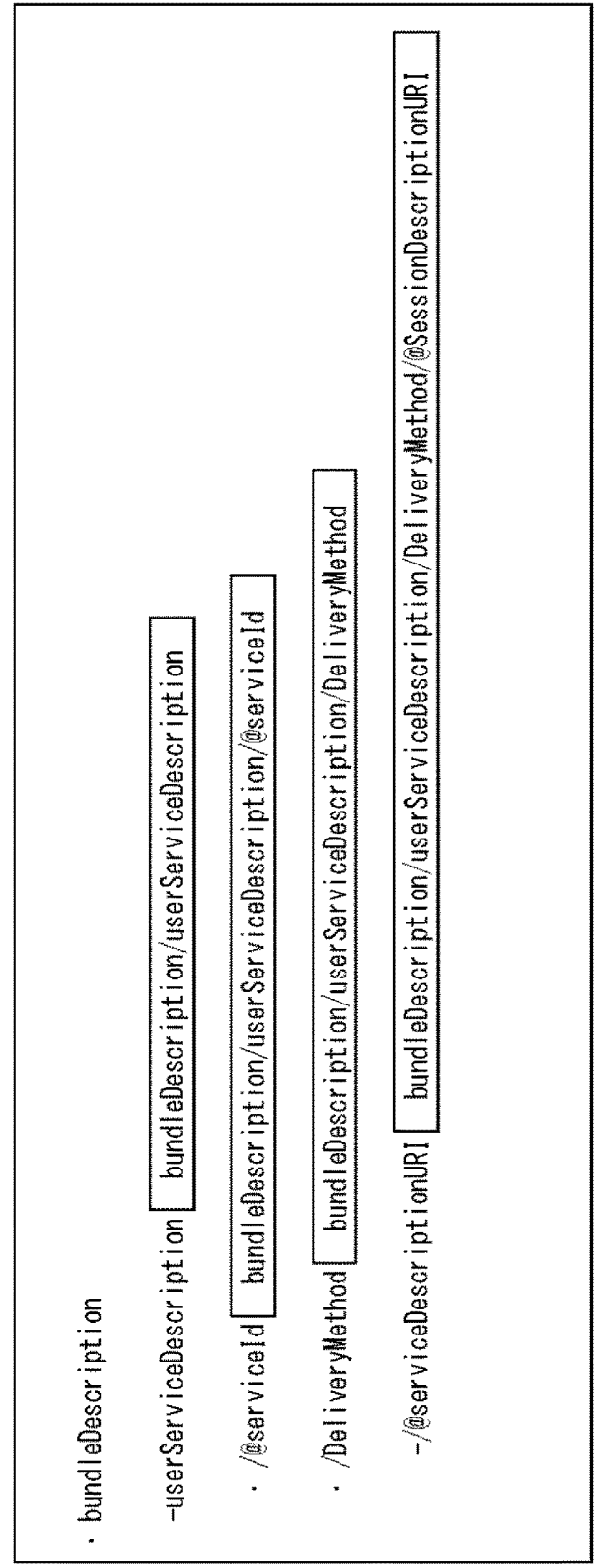
FIG. 10 is a view illustrating an example of an element and an attribute of XML composing the USD as the thumbnail metadata described in XML.

FIG. 10 is a view illustrating an example of an element and an attribute of XML composing the USD as the thumbnail metadata described in Extensible Markup Language (XML).

The USD includes bundleDescription (element), bundleDescription/UserServiceDescription (element), bundleDescription/userServiceDescription/@serviceId (attribute), bundleDescription/userServiceDescription/DeliveryMethod (element), and bundleDescription/userServiceDescription/DeliveryMethod/@ sessionDescriptionURI (attribute).

Herein, bundleDescription/UserServiceDescription indicates that UserServiceDescription (element) is the element included in bundleDescription (element), for example, and is hereinafter also referred to as UserServiceDescription or /UserServiceDescription.

For example, bundleDescription/userServiceDescription/@serviceId indicates that serviceId is the attribute belonging to /userServiceDescription and is hereinafter also referred to as serviceId or /@serviceId.

The bundleDescription element is information of assembly of one or more services and the UserServiceDescription element is information of an individual service. The serviceId attribute is a service identifier for identifying the service and a DeliveryMethod element is information of a method of delivering the content provided by the service.

A sessionDescriptionURI attribute indicates information for referring to a file including information for receiving the content provided by the service.

The SDP (file) is adopted, for example, as the file including the information for receiving the content provided by the service.

When the SDP is adopted as the file including the information for receiving the content provided by the service, information including the IP address and port number of multicasting when the content is delivered by multicasting is adopted as the information for receiving the content provided by the service. Furthermore, the URI of the SDP and the like is set as the attribute value in the sessionDescriptionURI attribute indicating information for referring to the SDP.

The USD as the thumbnail metadata includes the thumbnail signaling information in addition to the above-described bundleDescription element, UserServiceDescription element, serviceId attribute, DeliveryMethod element, and sessionDescriptionURI attribute.

Meanwhile, any metadata including information equivalent to one or more of the bundleDescription element, UserServiceDescription element, serviceId attribute, DeliveryMethod element, and sessionDescriptionURI attribute and the thumbnail signaling information may be adopted as the thumbnail metadata in place of the above-described USD including the bundleDescription element, UserServiceDescription element, serviceId attribute, DeliveryMethod element, sessionDescriptionURI attribute, and thumbnail signaling information.

Figure 11:
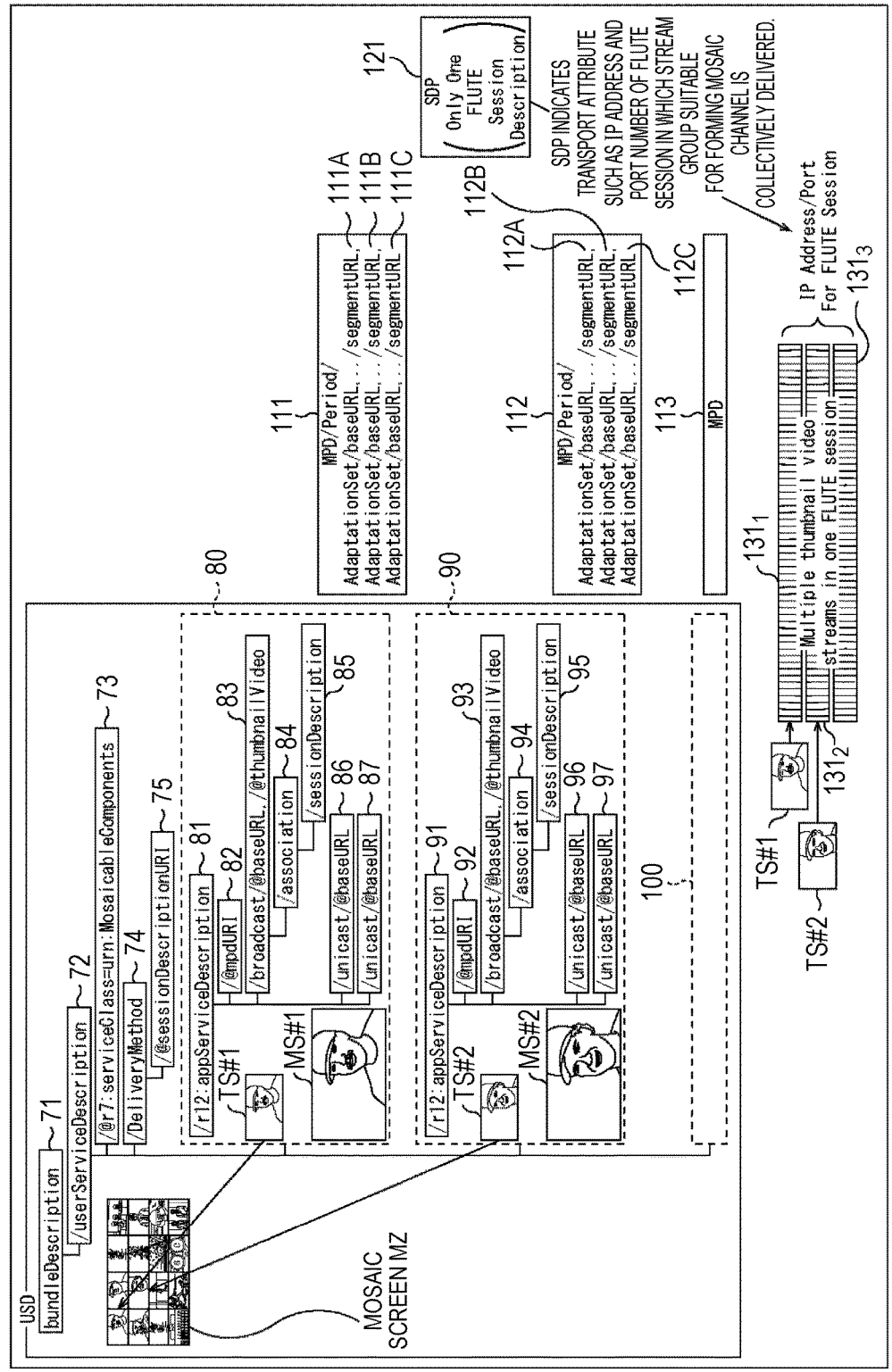
FIG. 11 is a view illustrating an example of the USD as the thumbnail metadata described in XML.

FIG. 11 is a view illustrating an example of the USD as the thumbnail metadata described in XML.

A bundleDescription element 71 corresponding to the User Service Bundle Description 61 in FIG. 9 is a root element of the USD.

A UserServiceDescription element 72 corresponds to the UserServiceDescription 62 in FIG. 9. The UserServiceDescription element 72 included in the bundleDescription element 71 corresponds to the individual service.

A /@r7:serviceClass attribute 73 belongs to the UserServiceDescription element 72. Herein, "r7" in the /@r7:serviceClass attribute 73 indicates that the /@r7:serviceClass attribute 73 is introduced in release 7 of 3GPP specifications.

As for the USD as the thumbnail metadata, "urn:MosaicableComponents" is newly adopted as a scheme identifier (class name of serviceClass) as the attribute value of the /@r7:serviceClass attribute 73.

The new attribute value "urn:MosaicableComponents" indicates that the service (channel) which delivers the video corresponding to the USD in which the /@r7:serviceClass attribute 73 in which the attribute value "urn:MosaicableComponents" is set is described (video information of which is described in the USD) is the service which delivers (the video including) the thumbnail video suitable for forming the mosaic screen.

Therefore, the /@r7:serviceClass attribute 73 in which the attribute value "urn:MosaicableComponents" is set serves as the thumbnail signaling information indicating that the video is the thumbnail video (plays a role as the thumbnail signaling information).

Meanwhile, in the USD in FIG. 11, a /@thumbnailVideo attribute to be described later also serves as the thumbnail signaling information in addition to the /@r7:serviceClass attribute 73. Therefore, the /@r7:serviceClass attribute 73 as the thumbnail signaling information may be omitted.

A /DeliveryMethod element 74 corresponding to the Delivery Method 63 in FIG. 9 includes a /@sessionDescriptionURI attribute 75.

The URI of SDP 121 (information for referring to the SDP 121) in which the IP address and port number of multicasting are described for receiving the content provided by the service information of which is described in the USD including the /@sessionDescriptionURI attribute 75 is set in the /@sessionDescriptionURI attribute 75.

Each of descriptions 80, 90, and 100 being the description including a /r12:appServiceDescription element as a highest (layer) element is information of the content provided by each of a plurality of different services (channels) (broadcast stations) which may form one mosaic screen MZ.

Therefore, the USD includes the /r12:appServiceDescription element for each of a plurality of contents which may form one mosaic screen.

Herein, the descriptions 80, 90, and 100 are the information of the contents provided by services ch#1, ch#2, and ch#3, respectively.

The description 80 includes a /r12:appServiceDescription element 81 included in the /UserServiceDescription element 72. The r12:appServiceDescription element 81 is information for signaling whether (the segment of) the content provided by the service ch#1 is multicast-delivered (or broadcast-delivered) or unicast-delivered to the client 13.

The /r12:appServiceDescription element 81 includes a /@mpdURI attribute and further includes any one or both of one or more /broadcast elements and one or more /unicast elements.

Herein, the URI of the MPD for performing the replay control of the content the delivery method of which is indicated by the /r12:appServiceDescription element including the /@mpdURI attribute is set in the /@mpdURI attribute.

The /broadcast element including a baseURL attribute indicating the URL of the content the delivery method of which is indicated by the /r12:appServiceDescription element including the /broadcast element indicates that the content the URL of which is indicated by the baseURL attribute is delivered by multicasting.

The /unicast element including the baseURL attribute indicating the URL of the content the delivery method of which is indicated by the /r12:appServiceDescription element including the /unicast element indicates that the content the URL of which is indicated by the baseURL attribute is delivered by unicasting.

In FIG. 11, the /r12:appServiceDescription element 81 in the description 80 includes a /@mpdURI attribute 82 and further includes one /broadcast element 83 and two /unicast elements 86 and 87.

Since the /r12:appServiceDescription element 81 includes one /broadcast element 83 and two /unicast elements 86 and 87, it may be recognized that there are one stream which is multicast-delivered and two streams which are unicast as (the streams) of the content of the service ch#1 the delivery method of which is indicated by the /r12:appServiceDescription element 81.

The URI of MPD 111 of the content provided by the service ch#1 is set in the /@mpdURI attribute 82.

The /broadcast element 83 indicates that a certain stream $131_1$ of the content provided by the service ch#1 is multicast-delivered and includes a /@baseURL attribute and the /@thumbnailVideo attribute in FIG. 11.

The URL of the stream $131_1$ of the content indicated to be multicast-delivered by the /broadcast element 83, that is to say, AdaptasionSet/baseURL 111A of the stream $131_1$ described in the MPD 111 of the content of the service ch#1 indicated to be multicast-delivered by the /broadcast element 83 is set in the /@baseURL attribute included in the /broadcast element 83.

The /@thumbnailVideo attribute included in the /broadcast element 83 being a boolean type attribute serves as the thumbnail signaling information indicating whether the stream $131_1$ of the content indicated to be multicast-delivered by the /broadcast element 83 is (the stream of) the thumbnail video.

In FIG. 11, the stream $131_1$ is the stream of thumbnail video TS#1.

The /broadcast element 83 further includes a /association element 84 and the /association element 84 includes a /sessionDescription element 85.

The /sessionDescription element 85 indicates the URI of SDP 121 in which the IP address and port number to which the stream $131_1$ of the content indicated to be multicast-delivered by the /broadcast element 83 is multicast-delivered are described. That is to say, the /sessionDescription element 85 indicates the SDP 121 identical to (the URI of) the SDP 121 indicated by the /@sessionDescription URI attribute 75.

A /unicast element 86 indicates that another stream (for example, stream of main video MS#1) of the content provided by the service ch#1 is unicast-delivered and includes the /@baseURL attribute.

The URL of another stream of the content indicated to be unicast-delivered by the /unicast element 86, that is to say, AdaptasionSet/baseURL 111B of another stream described in the MPD 111 of the content indicated to be unicast-delivered by the /unicast element 86 is set in the /@baseURL attribute included in the /unicast element 86.

A /unicast element 87 indicates that still another stream (for example, audio stream) of the content provided by the service ch#1 is unicast-delivered and includes the /@baseURL attribute.

The URL of still another stream of the content indicated to be unicast-delivered by the /unicast element 87, that is to say, AdaptasionSet/baseURL 111C of still another stream described in the MPD 111 of the content indicated to be unicast-delivered by the /unicast element 87 is set in the /@baseURL attribute included in the /unicast element 87.

The information similar to that of the description 80 is included also in the descriptions 90 and 100 for the services ch#1 and ch#2, respectively.

Herein, in FIG. 11, /r12:appServiceDescription element 91 to /unicast element 97 are information similar to the /r12:appServiceDescription element 81 to /unicast element 87.

The MPD 112 and 113 are the MPD of the contents provided by the services ch#2 and ch#3, respectively.

In the service ch#2 (also in the services ch#1 and ch#3), (a stream of) thumbnail video TS*2 is multicast-delivered and (streams of) main video MS*2 and audio are unicast-delivered, and AdaptasionSet/baseURL (and segmentURL) thereof, that is to say, AdaptasionSet/base URL 112A of the thumbnail video TS#2, AdaptasionSet/baseURL 112B of the main video MS#2, and AdaptasionSet/baseURL 112C of the audio are described in the MPD 112.

Furthermore, in FIG. 11, the thumbnail video TS*1 provided by the service ch#1, the thumbnail video TS*2 provided by the service ch#2, and the thumbnail video provided by the service ch#3 are of the same image size of 480×270 (width×height) pixels and the like, for example, the videos arranged in four rows and four columns, for example, on the display screen of 1920×1080 pixels, for example.

The stream $131_1$ of the thumbnail video TS*1 provided by the service ch#1, a stream $131_2$ of the thumbnail video TS*2 provided by the service ch#2, and a stream $131_3$ of the thumbnail video provided by the service ch#3 are collectively multicast-delivered in one FLUTE session over the MBMS bearer, for example.

In the SDP 121, the IP address and port number to which the stream $131_1$ of the thumbnail video TS*1 provided by the service ch#1, the stream $131_2$ of the thumbnail video TS*2 provided by the service ch#2, and the stream $131_3$ of the thumbnail video TS*3 provided by the service ch#3 are multicast-delivered in one FLUTE session are described as described above.

The client 13 may receive the USD in FIG. 11, thereby recognizing that the thumbnail video is delivered by the /@r7:serviceClass attribute 73 in which the attribute value "urn:MosaicableComponents" is set and the /@thumbnailVideo attribute as the thumbnail signaling information.

Furthermore, the client 13 may recognize that there is the stream which is multicast-delivered and the stream which is multicast-delivered is (the stream of) the thumbnail video by the /broadcast element 83 including the /@thumbnailVideo attribute and the like.

The client 13 may receive the SDP 121 in which the IP address and port number to which the thumbnail video is multicast-delivered are described by the URI of the SDP 121 indicated by the /broadcast element 83, /association element 84/, sessionDescription element 85 and the like and may receive the stream $131_1$ of the thumbnail video TS*1 provided by the service ch#1, the stream $131_2$ of the thumbnail video TS*2 provided by the service ch#2, and the stream $131_3$ of the thumbnail video provided by the service ch#3 which are multicast-delivered in one FLUTE session based on the IP address and port number described in the SDP 121.

Therefore, the client 13 may receive the thumbnail video TS*1 of the service channel ch#1, the thumbnail video TS*2 of the service channel ch#2, and the thumbnail video of the service channel ch#3 as the contents provided by a plurality of services forming one mosaic screen MZ and easily generate the mosaic screen MZ by using the thumbnail videos.

Meanwhile, although three /r12:appServiceDescription elements (/r12:appServiceDescription elements 81, 91 and the like) indicating whether the content is multicast-delivered (or broadcast-delivered) or unicast-delivered are described in the USD in FIG. 11, the number of /r12:appServiceDescription elements described in one USD is not limited to three.

That is to say, the /r12:appServiceDescription elements as many as the services providing the thumbnail videos capable of forming one mosaic screen MZ may be described, for example, in one USD.

The thumbnail videos of the same genre such as baseball relay, for example, may be adopted as the thumbnail videos capable of forming one mosaic screen MZ. However, the thumbnail videos capable of forming one mosaic screen MZ are not limited to the thumbnail videos of the same genre.

In the client 13, when the user who watches the mosaic screen MZ on which the thumbnail video TS#1 of the service ch#1, the thumbnail video TS#2 of the service ch#2, and the thumbnail video of the service ch#3 are arranged selects certain thumbnail video on the mosaic screen MZ, the user may select a channel to switch the display screen from the mosaic screen MZ to the main video (and audio) provided by the service providing the thumbnail video selected by the user.

For example, when the user selects the thumbnail video TS#1 of the service ch#1, the client 13 may obtain (receive, recognize) the MPD 111 of the content of the service ch#1 based on the /@mpdURI attribute 82 included in the /r12:appServiceDescription element 81 regarding the service ch#1 (/r12:appServiceDescription element 81 including the /broadcast element 83 indicating that the thumbnail video TS#1 of the service ch#1 is multicast-delivered).

The client 13 may recognize that the main video MS#1 and audio of the service ch#1 are unicast-delivered based on the /unicast elements 86 and 87 included in the /r12:appServiceDescription element 81 regarding the service ch#1.

The client 13 may transmit the HTTP request to request the main video MS#1 and audio of the service ch#1 based on the MPD 111 and receive the main video MS#1 and audio of the service ch#1 which are unicast-delivered according to the HTTP request to replay.

Meanwhile, the main video MS#1 and audio of the service ch#1 may be unicast-delivered and may be multicast-delivered as the thumbnail video TS#1 of the service ch#1.

The main video MS#1 and audio of the service ch#1 (furthermore, the main video and audio of the services providing the thumbnail videos capable of forming one mosaic screen MZ) may be multicast-delivered in the same FLUTE session together with the thumbnail video TS#1 of the service ch#1 (furthermore, the thumbnail video of another channel capable of forming one mosaic screen MZ).

In this case, it is possible to significantly improve channel selecting performance in the client 13, that is to say, to extremely rapidly switch from the mosaic screen MZ to the main video and audio of the service providing the thumbnail video selected by the user.

<MPD as Thumbnail Metadata>

Figure 12:
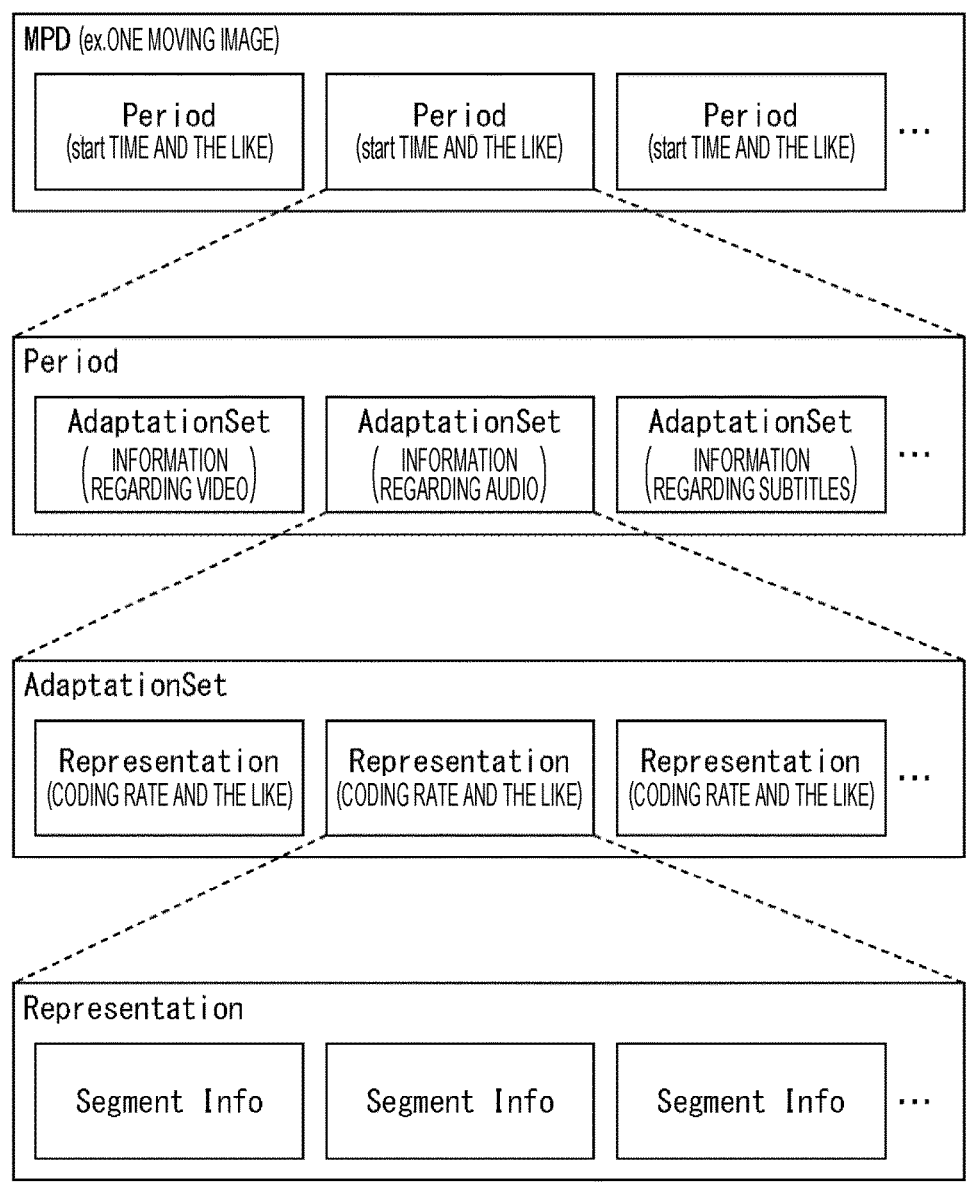
FIG. 12 is a view illustrating an overview of the MPD as the thumbnail metadata.

FIG. 12 is a view illustrating an overview of the MPD as the thumbnail metadata.

The MPD as the thumbnail metadata is formed so as to be similar to the MPD of the DASH.

That is to say, the MPD of certain content C includes one or more Periods.

The Period indicates a section obtained by dividing the content C in a time direction and start time and the like of the section indicated by the Period is described in the Period.

The Period includes the required number of AdaptationSets. The AdaptationSet is prepared for each medium such as the video, audio, subtitles and the like, for example, and information of language and codec and the like is described in the AdaptationSet.

The AdaptationSet includes the required number of Representations. The Representation is prepared for each bit rate and the like, for example, and the bit rate, image size and the like are described in the Representation.

The Representation includes the required number of pieces of SegmentInfo and information of the segment is described in the SegmentInfo.

Figure 13:
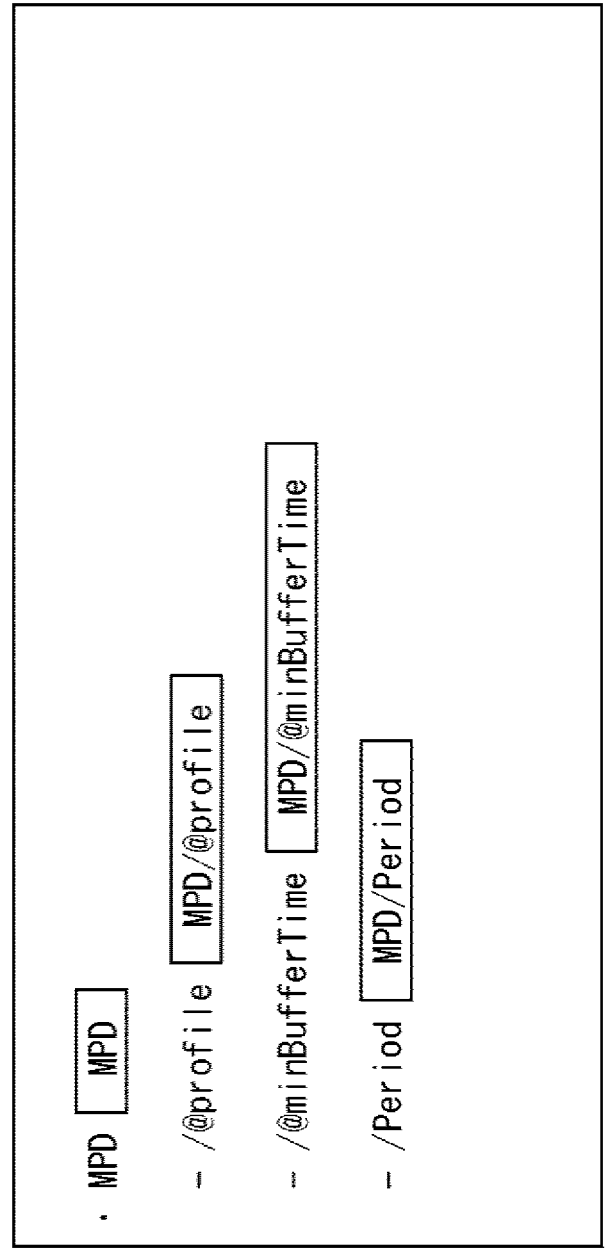
FIG. 13 is a view illustrating an example of the element and attribute of XML composing the MPD as the thumbnail metadata described in XML.

FIG. 13 is a view illustrating an example of the element and attribute of XML composing the MPD as the thumbnail metadata described in XML.

The MPD includes MPD (element), MPD/@profile (attribute), MPD/Period (element), and MPD/@minBufferTime (attribute).

The MPD element being a root element includes a /@profile attribute and a /@minBufferTime attribute.

A /Period element being information of the section obtained by dividing the content corresponding to the MPD in which the /Period element is described (content the replay control of which is performed by the MPD) in the time direction is used for collecting the segments in the section.

The /@profile attribute indicates an operational profile which the MPD in which the /@profile attribute is described follows and the /@minBufferTime attribute indicates minimum buffer time (data buffer amount) required before the replay of the content corresponding to the MPD in which the /@minBufferTime attribute is described starts.

The MPD as the thumbnail metadata includes the thumbnail signaling information in addition to the above-described MPD element, /@profile attribute, /Period element, and /@minBufferTime attribute.

An MPD/Period/AdaptationSet/ViewPoint/@schemeIdURI attribute in which information indicating that the content the replay control of which is performed by the MPD is the thumbnail video is described as the attribute value may be adopted, for example, as the thumbnail signaling information included in the MPD.

Meanwhile, any metadata including information equivalent to one or more of the MPD element, /@profile attribute, /Period element, /@minBufferTime attribute and the thumbnail signaling information may be adopted in place of the above-described MPD including the MPD element, /@profile attribute, /Period element, /@minBufferTime attribute, and thumbnail signaling information as the thumbnail metadata.

FIG. 14 is a view illustrating an example of the MPD as the thumbnail metadata described in XML.

That is to say, FIG. 14 illustrates an example of the MPD of the content including the video thumbnail (for example, the thumbnail video TS#1, main video MS#1, and audio as the content provided by the service ch#1).

In the MPD in FIG. 14, the MPD element is the root element, and a Period element belonging to the MPD element, an AdaptationSet element belonging to the Period element, and a ViewPoint element belonging to the AdaptationSet element are described.

In FIG. 14, the AdaptationSet element in description 141 being AdaptationSet (element) of the thumbnail video includes a width attribute and a height attribute.

In the description 141, width='480' height='270' indicates that the image size of the thumbnail is 480×270 pixels.

Information regarding the display of the thumbnail video such as the image size is described as the attribute belonging to the AdaptationSet element or the element included in the AdaptationSet element in the description 141.

The ViewPoint element in description 142 includes a schemeIdURI attribute and an attribute value "urn:thumbnailVideo" is set in the schemeIdURI attribute in FIG. 14.

The attribute value "urn:thumbnailVideo" is a new scheme identifier indicating that the content the replay control of which is performed by the MPD (MPD/Period/AdaptationSet/ViewPoint/@schemeIdURI) including the attribute value "urn:thumbnailVideo" is the thumbnail video.

The schemeIdURI attribute belonging to ViewPoint element in which the attribute value "urn:thumbnailVideo" is set serves as the thumbnail signaling information.

Meanwhile, when a plurality of streams of different bit rates are prepared as (the streams of) the thumbnail video, the Representation element may be included in each of a plurality of bit rates of the thumbnail in the AdaptationSet element in the description 141.

According to the above-described MPD, the client 13 may specify (the segment of) the thumbnail video and obtain the thumbnail video to easily generate the mosaic screen formed of the thumbnail videos.

<OMA-ESG as Thumbnail Metadata>

Figure 15:
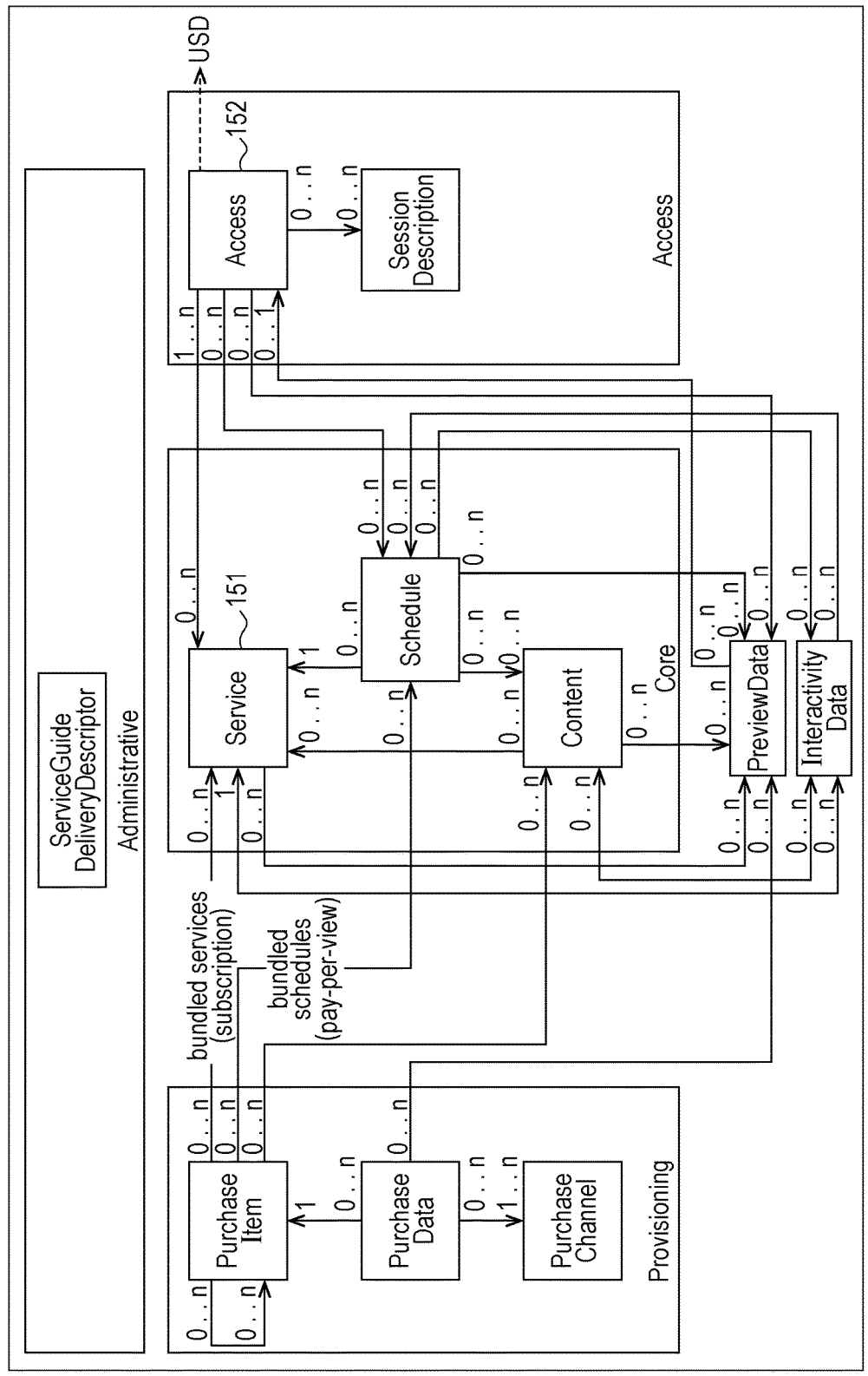
FIG. 15 is a view illustrating an example of a data model of the OMA-ESG as the thumbnail metadata.

FIG. 15 is a view illustrating an example of a data model of the OMA-ESG as the thumbnail metadata.

The data model of the thumbnail metadata in FIG. 15 is formed so as to be similar to the data model of the OMA-ESG.

In the OMA-ESG as the thumbnail metadata, however, the thumbnail signaling information indicating that the video of the content provided by the service the information of which is described in the OMA-ESG is the thumbnail video is included in Service 151.

Furthermore, in the OMA-ESG as the thumbnail metadata, Access 152 includes the URI of the USD, for example, as reference to the USD (FIG. 11) in which the information of the thumbnail video is described.

FIG. 16 is a view illustrating an example of the element and attribute of XML composing the OMA-ESG as the thumbnail metadata described in XML.

The OMA-ESG includes Access (element), Access/@id (attribute), Access/@version (attribute), Access/AccessType (element), Access/AccessType/BroadcastServiceDelivery (element), Access/AccessType/BroadcastServiceDelivery/SessionDescription (element), Access/AccessType/UnicastServiceDelivery (element), Access/ServiceClass (element), and Access/AccessType/BroadcastServiceDelivery/SessionDescription/USBDRef (element).

The Access element corresponding to the Access 152 in FIG. 15 is access information for accessing the service which refers to service information regarding the service.

A /@id attribute is an access information identifier which identifies access information (Access element) and a /@version attribute is version information indicating version of described contents of the access information.

A /AccessType element is information indicating whether the service is a broadcast service or a point-to-point service and a /BroadcastServiceDelivery element is information indicating that the service is the broadcast service.

A /SessionDescription element is information indicating session description and a UnicastServiceDelivery element is information indicating that the service is the point-o-point service.

A /ServiceClass element is information indicating a class of the service and a /USBDRef element is information including the URI of the USD, for example, for referring to the USD (FIG. 11) in which the information of the thumbnail video is described.

The OMA-ESG as the thumbnail metadata includes the thumbnail signaling information in addition to the above-described Access element, Access/@id attribute, Access/@version attribute, Access/AccessType element, Access/AccessType/BroadcastServiceDelivery element, Access/AccessType/BroadcastServiceDelivery/SessionDescription element, Access/AccessType/UnicastServiceDelivery element, Access/ServiceClass element, and USBDRef element.

A /ServiceType element in which the information indicating that the content provided by the service corresponding to the OMA-ESG (service the information of which is described in the OMA-ESG) is the thumbnail video may be adopted, for example, as the thumbnail signaling information included in the OMA-ESG.

The /ServiceType element is information included in a Service element. The Service element corresponding to the Service 151 in FIG. 15 is the service information regarding the service. A globalServiceID attribute as a service identifier which identifies the Service element (service information) belongs to (is included in) the Service element.

Meanwhile, as the thumbnail metadata, arbitrary metadata including the information equivalent to one or more of the Access element, Access/@id attribute, Access/@version attribute, Access/AccessType element, Access/AccessType/BroadcastServiceDelivery element, Access/AccessType/BroadcastServiceDelivery/SessionDescription element, Access/AccessType/UnicastServiceDelivery element, Access/ServiceClass element, and /USBDRef element and the thumbnail signaling information may be adopted in place of the above-described OMA-ESG including the Access element, Access/@id attribute, Access/@version attribute, Access/AccessType element, Access/AccessType/BroadcastServiceDelivery element, Access/AccessType/BroadcastServiceDelivery/SessionDescription element, Access/AccessType/UnicastServiceDelivery element, Access/ServiceClass element, /USBDRef element, and thumbnail signaling information.

Figure 17:
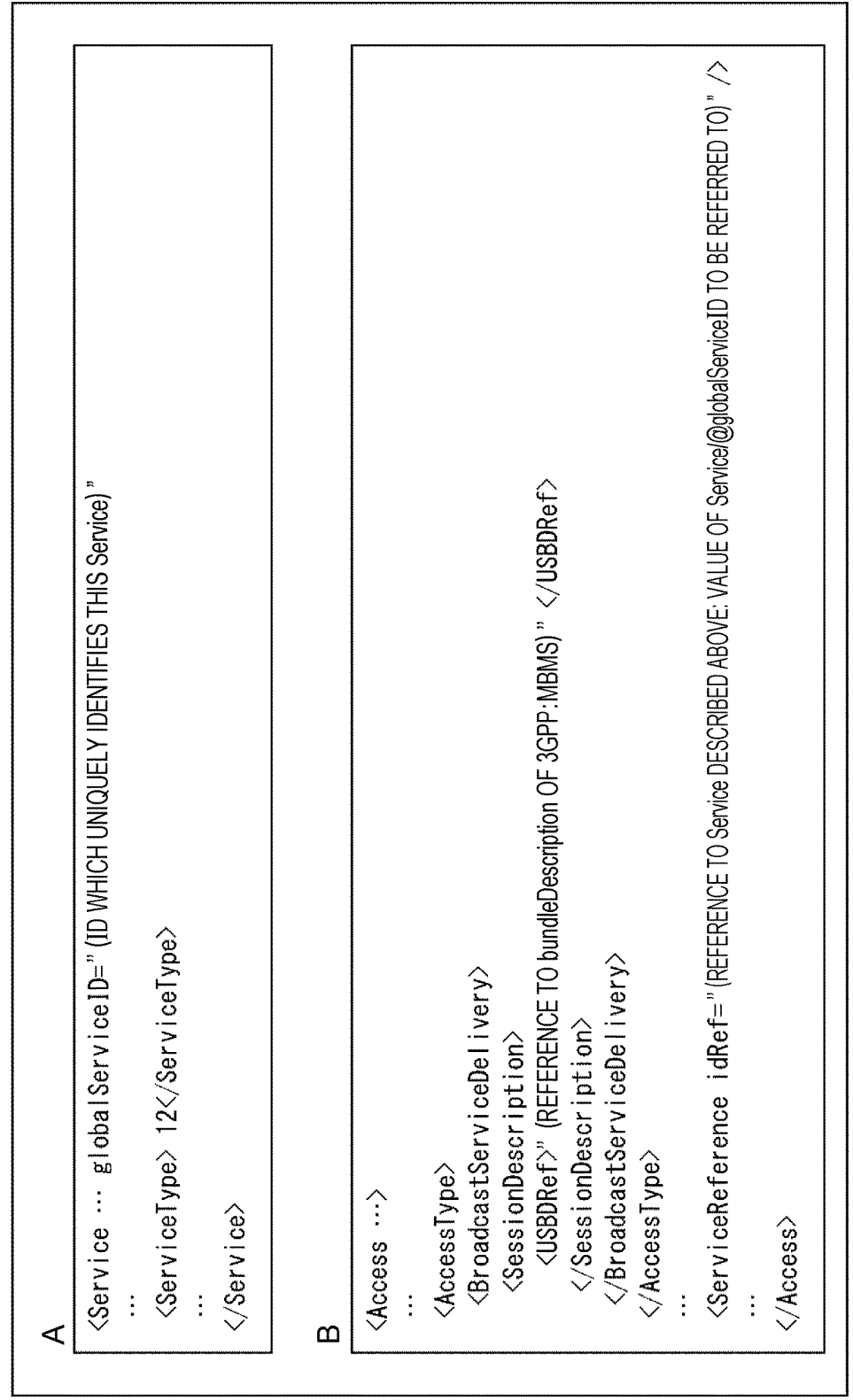
FIGS. 17A and 17B are views illustrating an example of the OMA-ESG as the thumbnail metadata described in XML.

FIGS. 17A and 17B are views illustrating an example of the OMA-ESG as the thumbnail metadata described in XML.

FIG. 17A illustrates an example of the Service element of the OMA-ESG as the thumbnail metadata and FIG. 17B illustrates an example of the Access element of the OMA-ESG as the thumbnail metadata.

In the Service element in FIG. 17A, 12, for example, as a value indicating that the video provided by the service corresponding to the OMA-ESG in which the Service element is described is the thumbnail video is introduced as a new value of the /ServiceType element.

In the /ServiceType element, 12 as the new value 12 is set.

The Service element in FIG. 17A includes a Service/globalServiceID attribute as a service identifier and Identification (ID) as the service identifier of the Service element in FIG. 17A is set in the globalServiceID attribute.

Herein, when the new value 12 is set in the /ServiceType element, at least the thumbnail video suitable for forming the mosaic screen is included in the content the information of which is described in the Service element including the /ServiceType element.

In the Access element in FIG. 17B, information including the URI of the USD, for example, is described in the /USBDRef element as reference to (the bundleDescription element (FIG. 11) being the root element of) the USD in which the information of the thumbnail video provided by the service corresponding to the OMA-ESG in which the /USBDRef element is described is described.

The Access element in FIG. 17B includes an Access/ServiceReference element and the /ServiceReference element includes an Access/ServiceReference/@idRef attribute.

The value set in the globalServiceID attribute of the Service element in FIG. 17A is set as the ID of the Service element to which the Access element in which the /@idRef attribute is described should refer in the /@idRef attribute.

Figure 18:
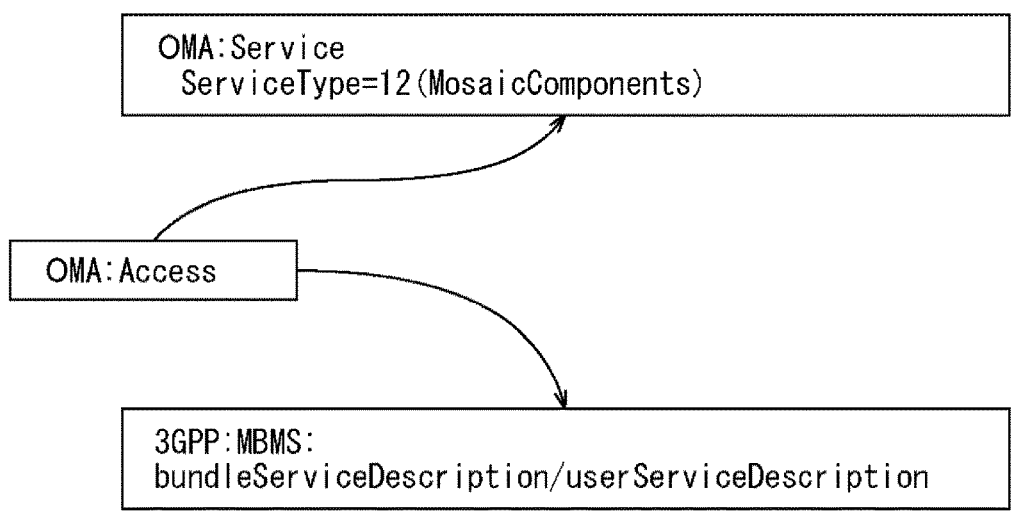
FIG. 18 is a view illustrating the OMA-ESG as the thumbnail metadata.

FIG. 18 is a view illustrating the OMA-ESG as the thumbnail metadata in FIGS. 17A and 17B.

When the client 13 receives the OMA-ESG as the thumbnail metadata in FIGS. 17A and 17B, this may refer to the Service element in FIG. 17A based on the /@idRef attribute of the Access element in FIG. 17B.

The client 13 may recognize that the video provided by the service corresponding to the OMA-ESG in which the Service element is described is the thumbnail video by referring to the /ServiceType element in which the new value 12 is described of the Service element in FIG. 17A.

When the client 13 requires the thumbnail video provided by the service corresponding to the OMA-ESG in which the Service element is described in FIG. 17A, this may refer to the /USBDRef element of the Access element in FIG. 17B to recognize the URI as the reference to (the bundleDescription element (FIG. 11) being the root element of) the USD in which the information of the thumbnail video provided by the service corresponding to the OMA-ESG in which the /USBDRef element is described is described, thereby obtaining (receiving) the USD (FIG. 11) in which the information of the thumbnail video is described based on the URI.

Thereafter, the client 13 may receive the thumbnail video as when the USD in FIG. 11 is received and easily generate the mosaic screen by using the thumbnail video.

Meanwhile, when using the combination of the MPD, SDP, USD, and OMA-ESG as the thumbnail metadata, it is possible to recognize whether the video is the thumbnail video from a Service/ServiceType element of the OMA-ESG, so that the /@r7:serviceClass attribute 73 of the USD (FIG. 11) may be omitted.

<Method of Delivering Content>

Figure 19:
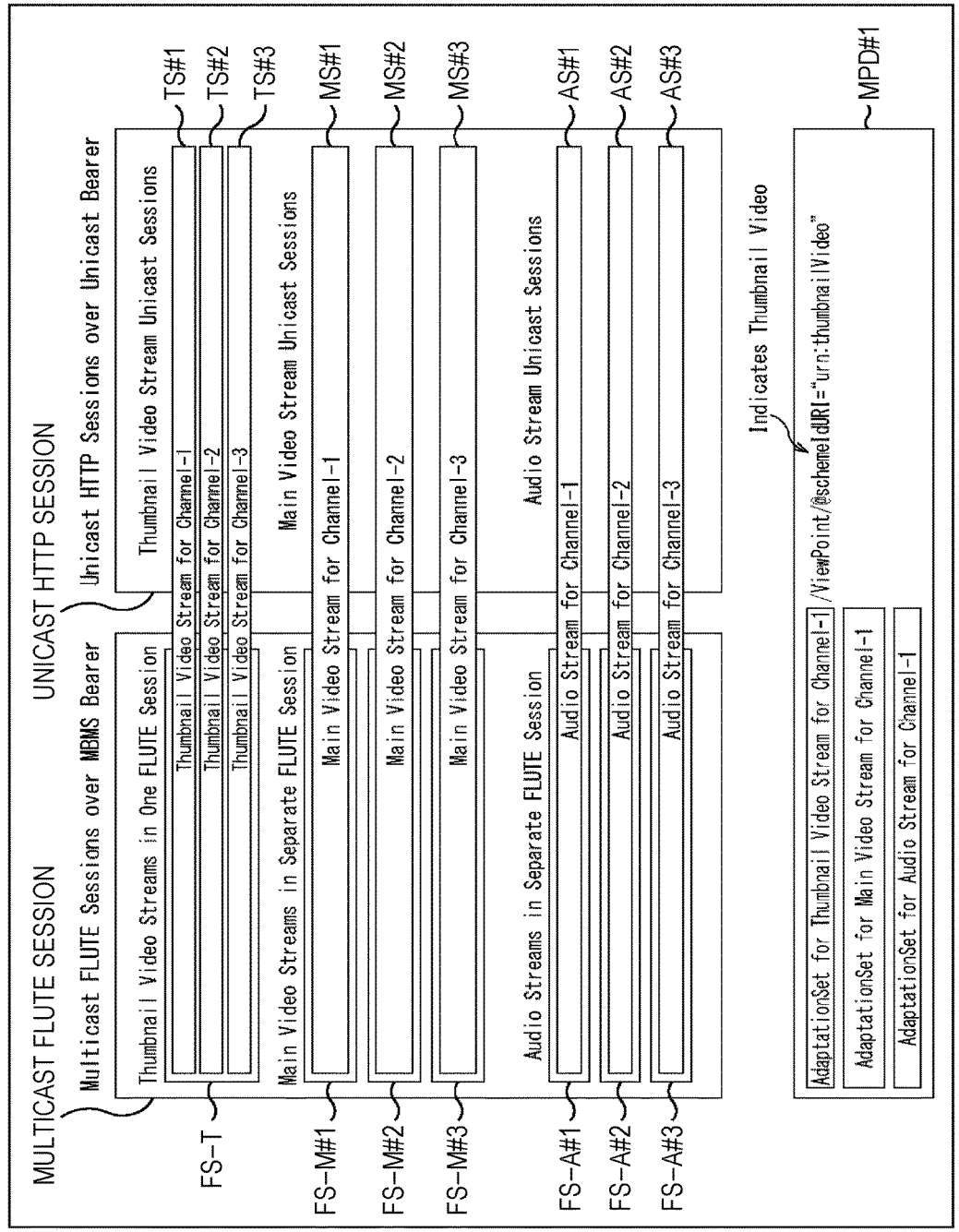
FIG. 19 is a view illustrating a first example of a method of delivering the content including the thumbnail video.

FIG. 19 is a view illustrating a first example of a method of delivering the content including the thumbnail video.

Meanwhile, three streams of the main video, audio, and thumbnail video are delivered by each of channels ch#1, ch#2, and ch#3 of three broadcast stations (services), for example, in FIG. 19.

The main video, audio, and thumbnail video delivered by the channel chi (herein, i=1, 2, or 3) are referred to as main video MS#i, audio AS#i, and thumbnail video TM#i, respectively.

This also applies in FIGS. 20, 21, and 27 to 29 described later.

In FIG. 19, the main videos MS#1 to MS#3, audios AS#1 to AS#3, and thumbnail videos TM#1 to TM#3 may be multicast-delivered (multicast delivery in multicast FLUTE session, for example) or unicast-delivered (for example, unicast delivery in unicast HTTP session, for example).

When the main videos MS#1 to MS#3, audios AS#1 to AS#3, and thumbnail videos TM#1 to TM#3 are multicast-delivered, the thumbnail videos TM#1 to TM#3 are multicast-delivered in one FLUTE session FS-T.

The main video MS#1, main video MS#2, and main video MS#3 are multicast-delivered in one FLUTE session FS-M#1, one FLUTE session FS-M#2, and one FLUTE session FS-M#3, respectively.

Furthermore, the audio AS#1, audio AS#2, and audio AS#3 are multicast-delivered in one FLUTE session FS-A#1, one FLUTE session FS-A#2, and one FLUTE session FS-A#3, respectively.

Meanwhile, AdaptationSet (element) of each of the main video MS#1, audio AS#1, and thumbnail video TM#1 is included in MPD#1 of the content of the channel ch#1. Furthermore, AdaptationSet of the thumbnail video TM#1 of the MPD#1 includes a ViewPoint/@schemeIdURI attribute in which an attribute value "urn:thumbnailVideo" is set as the thumbnail signaling information for signaling that (the video of) AdaptationSet is the thumbnail video. Meanwhile, in addition to the ViewPoint element, an element having a structure similar to that of the ViewPoint element such as a Role element, an EssentialProperty element, and a SupplementalProperty element may be adopted, for example, as the element to which the /@schemeIdURI attribute in which the attribute value "urn:thumbnailVideo" and the like is set belongs.

This also applies to the MPD of the contents of the channels ch#2 and ch#3.

Figure 20:
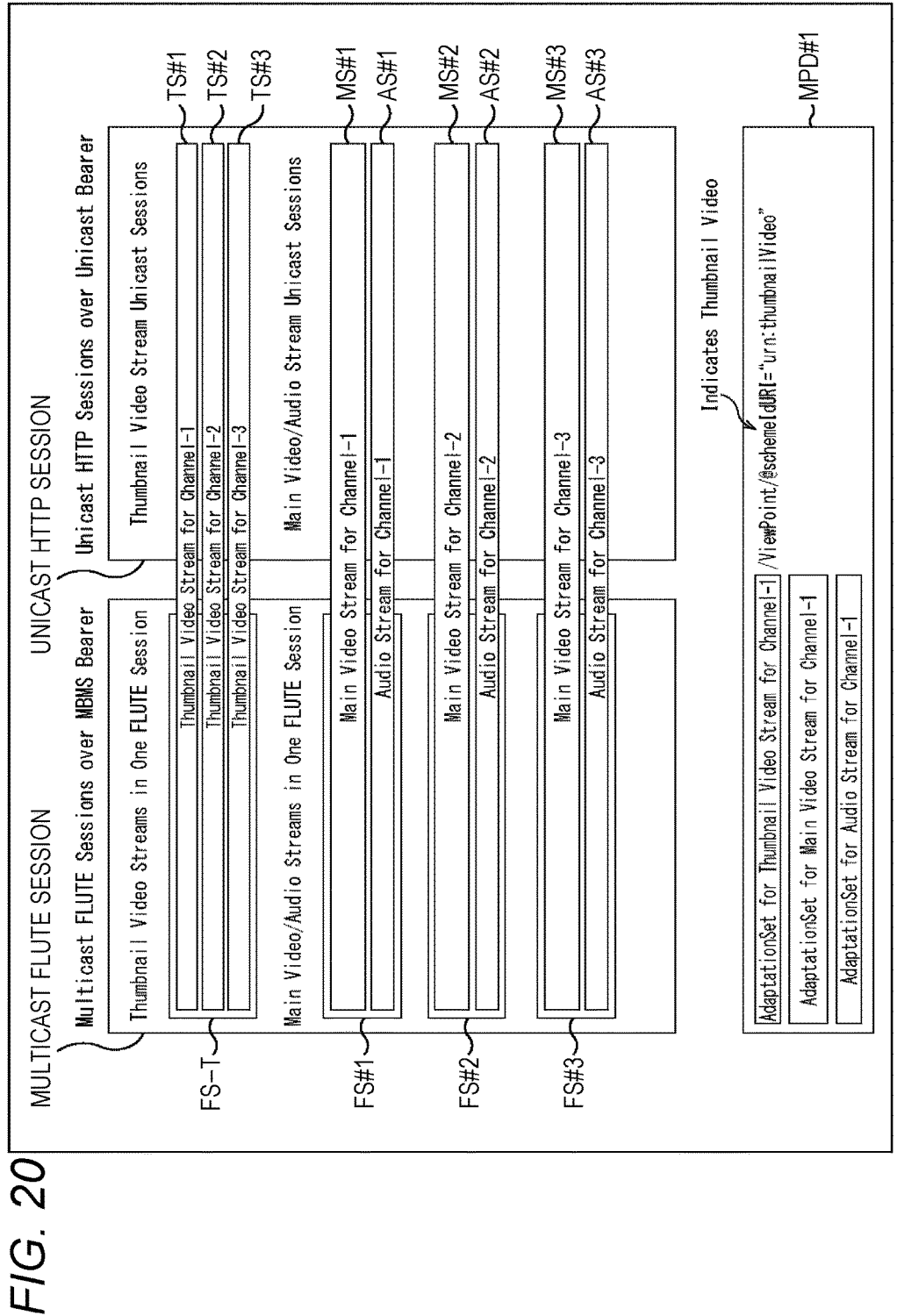
FIG. 20 is a view illustrating a second example of the method of delivering the content including the thumbnail video.

FIG. 20 is a view illustrating a second example of the method of delivering the content including the thumbnail video.

In FIG. 20, as in FIG. 19, the main videos MS#1 to MS#3, audios AS#1 to AS#3, and thumbnail videos TM#1 to TM#3 may be multicast-delivered or unicast-delivered.

When the main videos MS#1 to MS#3, audios AS#1 to AS#3, and thumbnail videos TM#1 to TM#3 are multicast-delivered, the thumbnail videos TM#1 to TM#3 are multicast-delivered in one FLUTE session FS-T as in FIG. 19.

The main video MS#1 and audio AS#1, the main video MS#2 and audio AS#2, and the main video MS#3 and audio AS#3 are multicast-delivered in one FLUTE session FS-M#1, one FLUTE session FS-M#2, and one FLUTE session FS-M#3, respectively.

Meanwhile, the MPD#1 of the content of the channel ch#1, the MPD of the content of the channel ch#2, and the MPD of the content of the channel ch#3 are configured as those in FIG. 19.

Figure 21:
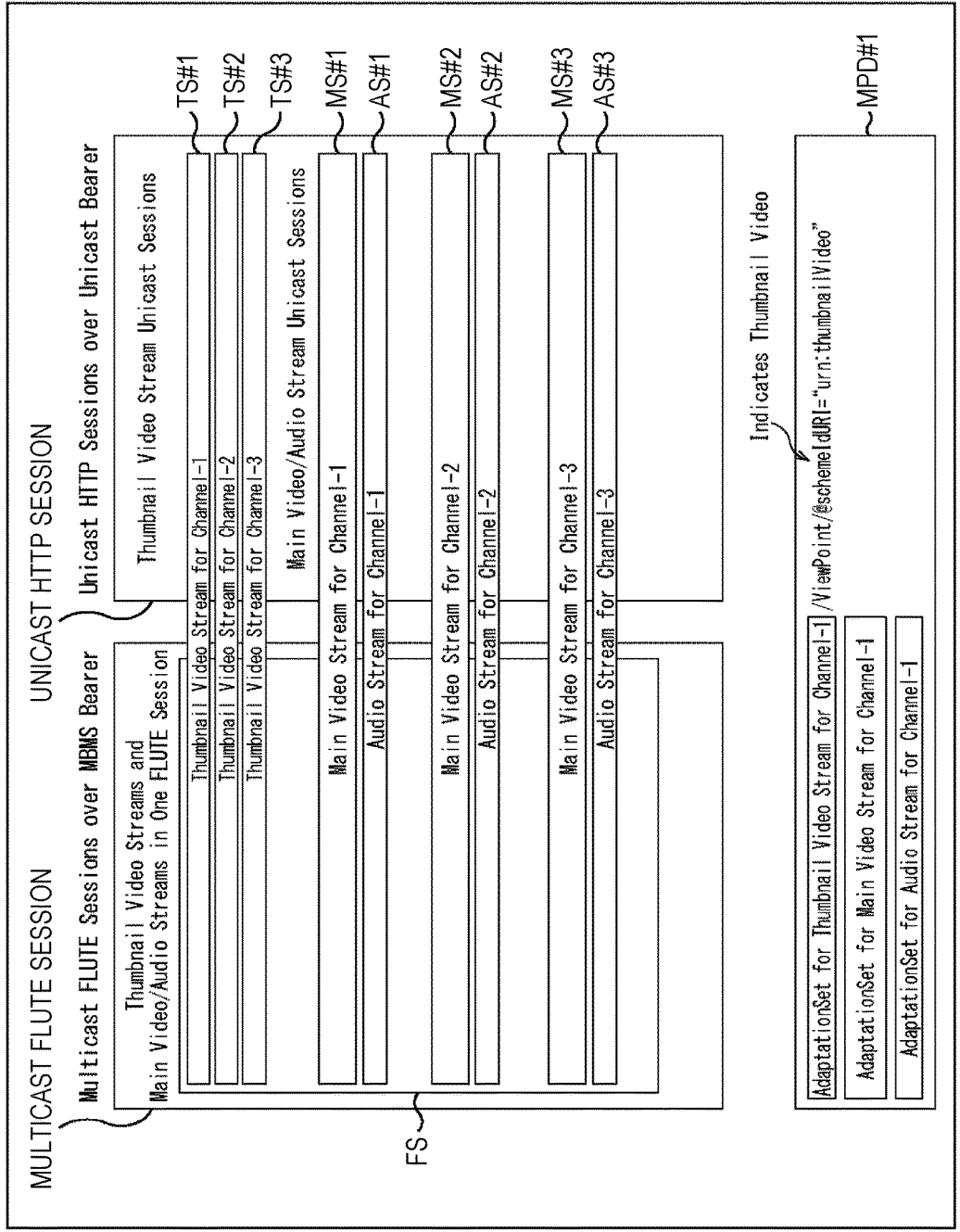
FIG. 21 is a view illustrating a third example of the method of delivering the content including the thumbnail video.

FIG. 21 is a view illustrating a third example of the method of delivering the content including the thumbnail video.

In FIG. 21, as in FIG. 19, the main videos MS#1 to MS#3, audios AS#1 to AS#3, and thumbnail videos TM#1 to TM#3 may be multicast-delivered or unicast-delivered.

When the main videos MS#1 to MS#3, audios AS#1 to AS#3, and thumbnail videos TM#1 to TM#3 are multicast-delivered, all the main videos MS#1 to MS#3, audios AS#1 to AS#3, and thumbnail videos TM#1 to TM#3 are multicast-delivered in one FLUTE session FS.

Meanwhile, the MPD#1 of the content of the channel ch#1, the MPD of the content of the channel ch#2, and the MPD of the content of the channel ch#3 are configured as those in FIG. 19.

<Display Example of Mosaic Screen>

Figure 22:
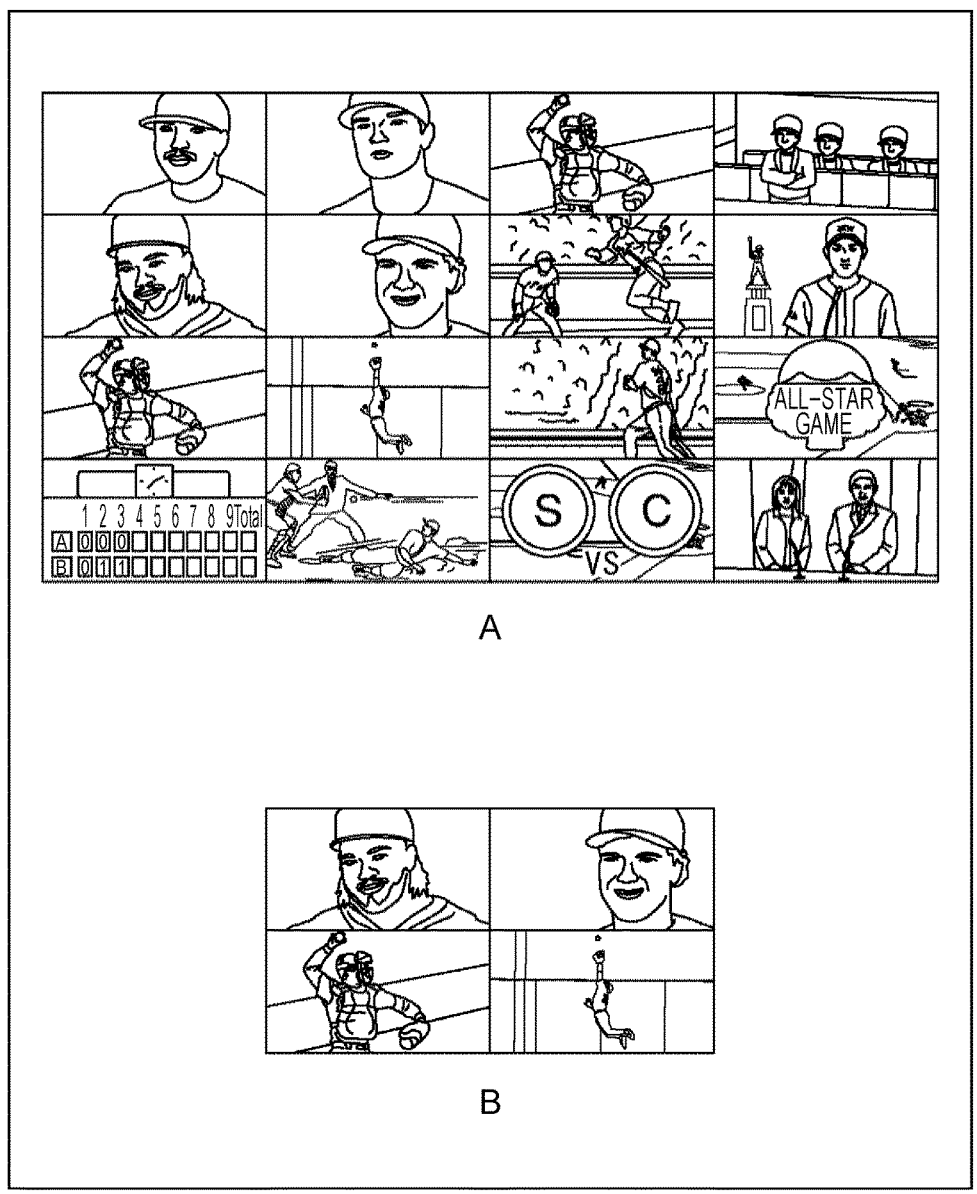
FIGS. 22A and 22B are views illustrating a display example of a mosaic screen in the client 13.

FIGS. 22A and 22B are views illustrating a display example of the mosaic screen in the client 13.

The client 13 may receive the thumbnail video based on the combination of the MPD, SDP, and USD as the thumbnail metadata and the combination obtained by adding the OMA-ESG to the same and display the mosaic screen on which the thumbnail videos are arranged in a lattice pattern, as described above.

FIG. 22A illustrates an example of the mosaic screen on which 16 thumbnail videos are arranged in four rows and four columns and FIG. 22B illustrates an example of the mosaic screen on which four thumbnail videos are arranged in two rows and two columns.

When the client 13 receives 16 thumbnail videos, if the image size of each thumbnail video is 480×270 pixels, for example, and the size of the display screen of the client 13 is 1920×1080 pixels (or larger), for example, it is possible to display the mosaic screen on which all the 16 thumbnail videos received by the client 13 are arranged in four rows and four columns as illustrated in FIG. 22A.

However, when the size of the display screen of the client 13 is smaller than 1920×1080 pixels, for example, 960×540 pixels, even when the client 13 receives 16 thumbnail videos, the number of thumbnail videos displayed as the mosaic screen is limited to four as illustrated in FIG. 22B.

As described above, when the size of the display screen of the client 13 is small and the number of thumbnail videos displayed as the mosaic screen is limited to the number smaller than the number of thumbnail videos received by the client 13, it is possible to display all the thumbnail videos received by the client 13 on the mosaic screen by making the image size of the thumbnail video smaller according to the size of the display screen of the client 13, for example.

That is to say, it is possible to display all the 16 thumbnail videos on the display screen of 960×540 pixels as the mosaic screen by making the thumbnail video of 480×270 pixels the thumbnail video of 240×135 pixels.

In this case, however, it is necessary for the client 13 to change the image size of the thumbnail video and a process burden of the client 13 becomes large. Furthermore, when the image size of the thumbnail video is made smaller to form (generate) the mosaic screen, it might be difficult to watch each thumbnail video.

When the number of thumbnail videos displayed as the mosaic screen is limited as described above, and also when this is not limited, if the thumbnail videos forming the mosaic screen (thumbnail videos displayed as the mosaic screen) may be selected (filtered) based on user preference, certain priority and the like, the mosaic screen suitable (optimal) for the user may be provided.

Therefore, in this technology, content description metadata being an attribute in which contents of the content (thumbnail video) are described is introduced, and the client 13 selects the thumbnail video forming the mosaic screen by using the content description metadata to provide the mosaic screen suitable for the user.

<First Example of MPD into which Content Description Metadata is Introduced>

FIG. 23 is a view illustrating a first example of the MPD as the thumbnail metadata into which the content description metadata is introduced.

The MPD in FIG. 23 is configured as the MPD in FIG. 14 except that description 201 is provided in place of the description 142 in FIG. 14.

The ViewPoint element in the description 201 includes the schemeIdURI attribute as the description 142 in FIG. 14 and an attribute value "urn:thumbnailVideo:dic" is set in the schemeIdURI attribute in FIG. 23.

The description "urn:thumbnailVideo" before colon (:) in the attribute value "urn:thumbnailVideo:dic" is a new scheme identifier indicating that the content is the thumbnail video as illustrated in FIG. 14, and according to the scheme identifier "urn:thumbnailVideo", the client 13 may recognize that (the video of) the content is the thumbnail video.

Description "dic" after the colon in the attribute value "urn:thumbnailVideo:dic" is information specifying a dictionary which defines a component of a value attribute to be described later (dictionary definition).

The ViewPoint element in the description 201 includes the value attribute which is a new attribute in addition to the above-described schemeIdURI attribute.

The value attribute being the content description metadata describing the contents of the content the replay control of which is performed by the MPD (MPD/Period/AdaptationSet/ViewPoint) including the value attribute, and an item indicating the contents of the content is set as the attribute value in the value attribute.

In FIG. 23, an attribute value "X, Y, Z, . . . " is described in the value attribute.

It is possible to describe one or more items as the attribute value in the value attribute; when a plurality of items is set as the attribute value in the value attribute, a plurality of items X, Y, Z, . . . is described with comma (,) as illustrated in FIG. 23, for example.

The item being the component composing the attribute value set in the value attribute is defined by the dictionary specified by the description "dic" after the colon in the attribute value "urn:thumbnailVideo:dic" as described above.

Therefore, the client 13 may recognize the definition (semantic content) of each item of the attribute value set in the value attribute based on the dictionary specified by the description "dic" after the colon in the attribute value "urn:thumbnailVideo:dic".

For example, suppose that first, second, and third items of the attribute value set in the value attribute are defined to be genre identification information indicating a genre, country identification information indicating a country, and an area identification information indicating an area, respectively, by the dictionary specified by the description "dic" after the colon in the attribute value "urn:thumbnailVideo:dic".

In this case, when the genre of (the thumbnail video of) the content is "baseball (baseball relay)" to relay a baseball game, the country in which the baseball game is taken place is "US (United States of America)", and the area in which the baseball game is taken place is "CA (California)", for example, an attribute value "baseball, US, CA" is set (encoded) in the value attribute by (the metadata generator 32 (FIG. 3) of) the aggregation server 12.

The client 13 may recognize that the genre of the content is the baseball relay, and that the baseball game is taken place in California in the United States of America from the attribute value "baseball, US, CA" set in the value attribute based on the dictionary specified by the description "dic" after the colon in the attribute value "urn:thumbnailVideo: dic".

Figure 24:
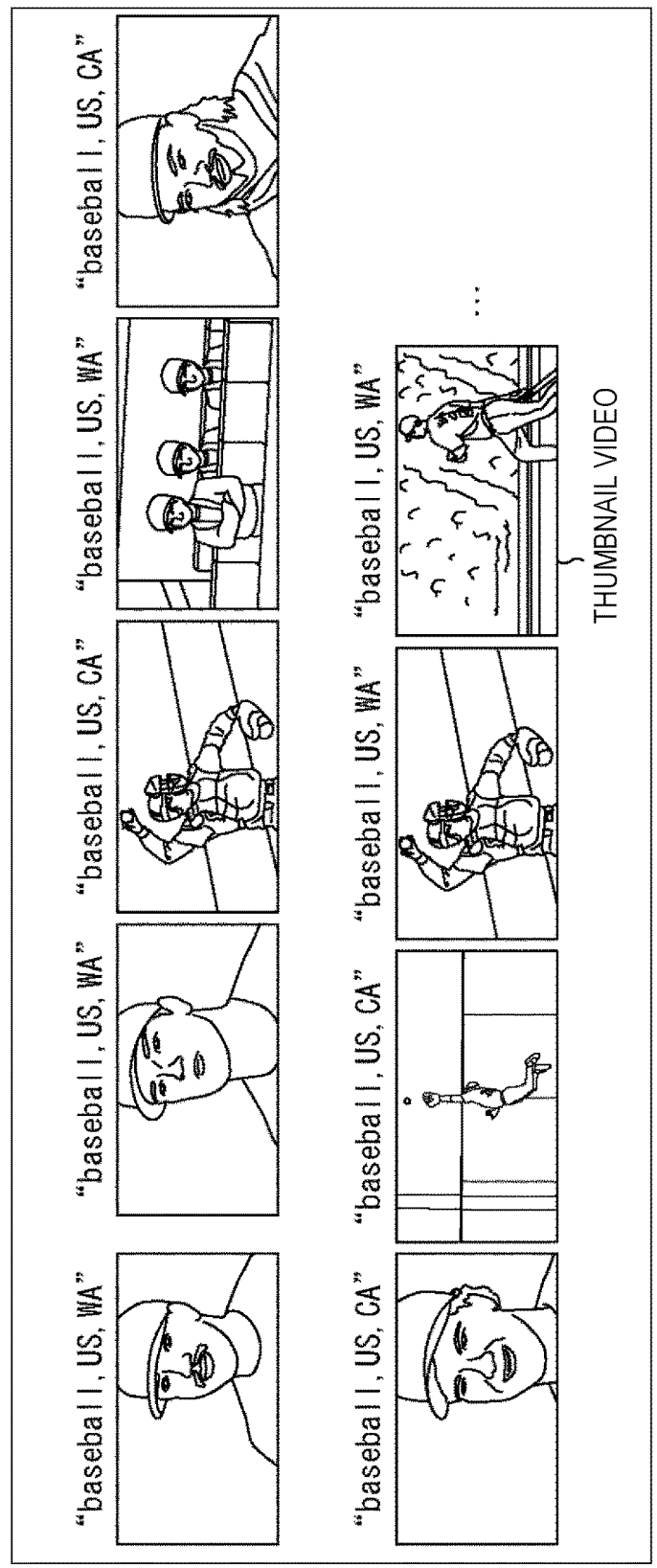
FIG. 24 is a view schematically illustrating an example of a plurality of (streams of) thumbnail videos multicast-delivered in one FLUTE session.

FIG. 24 is a view schematically illustrating an example of a plurality of (streams of) of thumbnail video multicast-delivered in one FLUTE session.

For example, suppose that 16 thumbnail videos of the same image size of 480×270 pixels are multicast-delivered in one FLUTE session and the attribute value "urn:thumbnailVideo:dic" similar to that in FIG. 23 is set in the schemeIdURI attribute, the attribute belonging to the ViewPoint element included in the AdaptationSet element of the thumbnail video in the MPD (in which AdaptationSet is described) of the 16 thumbnail videos.

Furthermore, suppose that the attribute value illustrated in FIG. 24 is set in the value attribute for each thumbnail video.

In this case, when the size of the display screen of the client 13 is 1920×1080 pixels (or larger), for example, the mosaic screen on which all the 16 thumbnail videos having the image size of 480×270 pixels are arranged in four rows and four columns delivered in one FLUTE session is displayed as illustrated in FIG. 22A in the client 13.

On the other hand, when the size of the display screen of the client 13 is smaller than 1920×1080 pixels, for example, 960×540 pixels, in the client 13, the number of thumbnail videos displayed as the mosaic screen is limited to four of two rows and two columns out of the 16 thumbnail videos as illustrated in FIG. 22B.

Therefore, in this case, it is required to select the four thumbnail videos to be displayed on the mosaic screen out of the 16 thumbnail videos.

Therefore, the client 13 performs filtering (hereinafter, also referred to as thumbnail filtering) to select the four thumbnail videos (forming the mosaic screen) displayed on the mosaic screen by using (the attribute value set in) the value attribute regarding the thumbnail video.

The thumbnail filtering may be performed based on preference information and the like indicating the preference of the user of the client 13, for example.

That is to say, if the user often views the relay of the game taken place in California (CA) in the United States of America (US) or if a place where the user locates (position of the client 13) is California in the United States of America, for example, the thumbnail video with the country identification information of "US" indicating the United States of America and the area identification information of "CA" indicating California in the attribute value set in the value attribute is selected as the thumbnail video to be displayed on the mosaic screen out of the 16 thumbnail videos by the thumbnail filtering.

Meanwhile, when the number of thumbnail videos selected by the thumbnail filtering is larger than the number of thumbnail videos which may be displayed on the mosaic screen, the client 13 may randomly select, for example, the thumbnail videos as many as those which may be displayed on the mosaic screen out of the thumbnail videos selected by the thumbnail filtering for example. Alternatively, it is possible to generate the mosaic screen larger than the display screen of the client 13 and scroll through the mosaic screen according to operation and the like of the user.

As described above, it is possible to realize an efficient service selection process (channel selection) by using the mosaic screen which fits to the size of the display screen as limitation in a device rendering environment of the client 13 by adding the value attribute as a dynamically changeable index for thumbnail filtering the thumbnail videos by the client 13 to the MPD.

<Second Example of MPD into which Content Description Metadata is Introduced>

FIG. 25 is a view illustrating a second example of the MPD as the thumbnail metadata into which the content description metadata is introduced.

The MPD in FIG. 25 is configured as the MPD in FIG. 23 except that descriptions 211 and 212 are provided in place of the description 201 in FIG. 23.

The ViewPoint element in the descriptions 211 and 212 includes the schemeIdURI attribute and the value attribute as the content description metadata as the ViewPoint element in the description 201 in FIG. 23.

In the description 211, the attribute value "urn:thumbnailVideo:dic" is set in the schemeIdURI attribute and in the description 212, an attribute value "urn:thumbnailVideo:JapaneseParameters" is set in the schemeIdURI attribute.

As illustrated in FIG. 23, the description "urn:thumbnailVideo" before the colon in the attribute values "urn:thumbnailVideo:dic" and "urn:thumbnailVideo:JapaneseParameters" set in the schemeIdURI attribute belonging to the ViewPoint element is the scheme identifier indicating that the content is the thumbnail video, and the client 13 may recognize that (the video of) the content is the thumbnail video according to the scheme identifier "urn:thumbnailVideo".

Furthermore, as illustrated in FIG. 23, the descriptions "dic" and "JapaneseParameters" after the colon in the attribute values "urn:thumbnailVideo:dic" and "urn:thumbnailVideo:JapaneseParameters" are the information (dictionary definition) to specify the dictionary which defines the component of the value attribute.

Suppose that the first, second, and third items of the attribute value set in the value attribute are defined to be the genre identification information indicating the genre, the country identification information indicating the country, and the area identification information indicating the area, respectively, for example, in the dictionary specified by the descriptions "dic" and "JapaneseParameters".

In the dictionary specified by the description "dic" (herein, also referred to as "dic" dictionary), it is specified (defined) that language of the genre identification information, country identification information, and area identification information is English, for example, and in the dictionary specified by the description "JapaneseParameters" (hereinafter, also referred to as "JapaneseParameters" dictionary), it is specified that the language of the genre identification information, country identification information, and area identification information is different from English, for example, Japanese.

Therefore, in the description 211 in which the "dic" dictionary is specified, the attribute value as the genre identification information, country identification information, and area identification information is described in English as "baseball, US, CA" in the value attribute.

On the other hand, in the description 212 in which "JapaneseParameters" dictionary is specified, the attribute value as the genre identification information, country identification information, and area identification information is described in Japanese as "baseball, United States of America, California" in the value attribute.

As described above, it is possible to arrange a plurality of ViewPoint elements in (the AdaptationSet element of) the MPD and describe (the attribute value set in) the value attribute in different languages.

<Third Example of MPD into which Content Description Metadata is Introduced>

FIG. 26 is a view illustrating a third example of the MPD as the thumbnail metadata into which the content description metadata is introduced.

The MPD in FIG. 26 is configured as the MPD in FIG. 23 except that description 221 is provided in place of the description 201 in FIG. 23.

The ViewPoint element in the description 221 includes the schemeIdURI attribute and the value attribute as the content description metadata as the ViewPoint element in the description 201 in FIG. 23.

In the description 211, an attribute value "http://baseballAuthority.com/thumbnailVideoGenre" is set in the schemeIdURI attribute.

The attribute value "http://baseballAuthority.com/thumbnailVideoGenre" serves as both the scheme identifier indicating that the content is the thumbnail video and the information specifying the dictionary defining the component of the value attribute (dictionary definition).

Therefore, the client 13 may recognize that (the video of) the content is the thumbnail video by the attribute value "http://baseballAuthority.com/thumbnailVideoGenre".

Furthermore, the attribute value "http://baseballAuthority.com/thumbnailVideoGenre" is an http URL and the http URL indicates an address of the dictionary defining the component (item) of the value attribute.

As described above, it is possible to arrange the dictionary which defines the component of the value attribute on a (web) server on the network such as the Internet and deliver the same in the same FLUTE session as that in which the thumbnail video is delivered (in case the client 13 cannot use the point-to-point bearer) when specifying the dictionary which defines the component of the value attribute by the http URL.

In this case, it is possible to easily change the dictionary which defines the component of the value attribute, thereby flexibly and easily change (or add or delete) the definition of the component of the value attribute by the dictionary.

<Method of Delivering Content>

Figure 27:
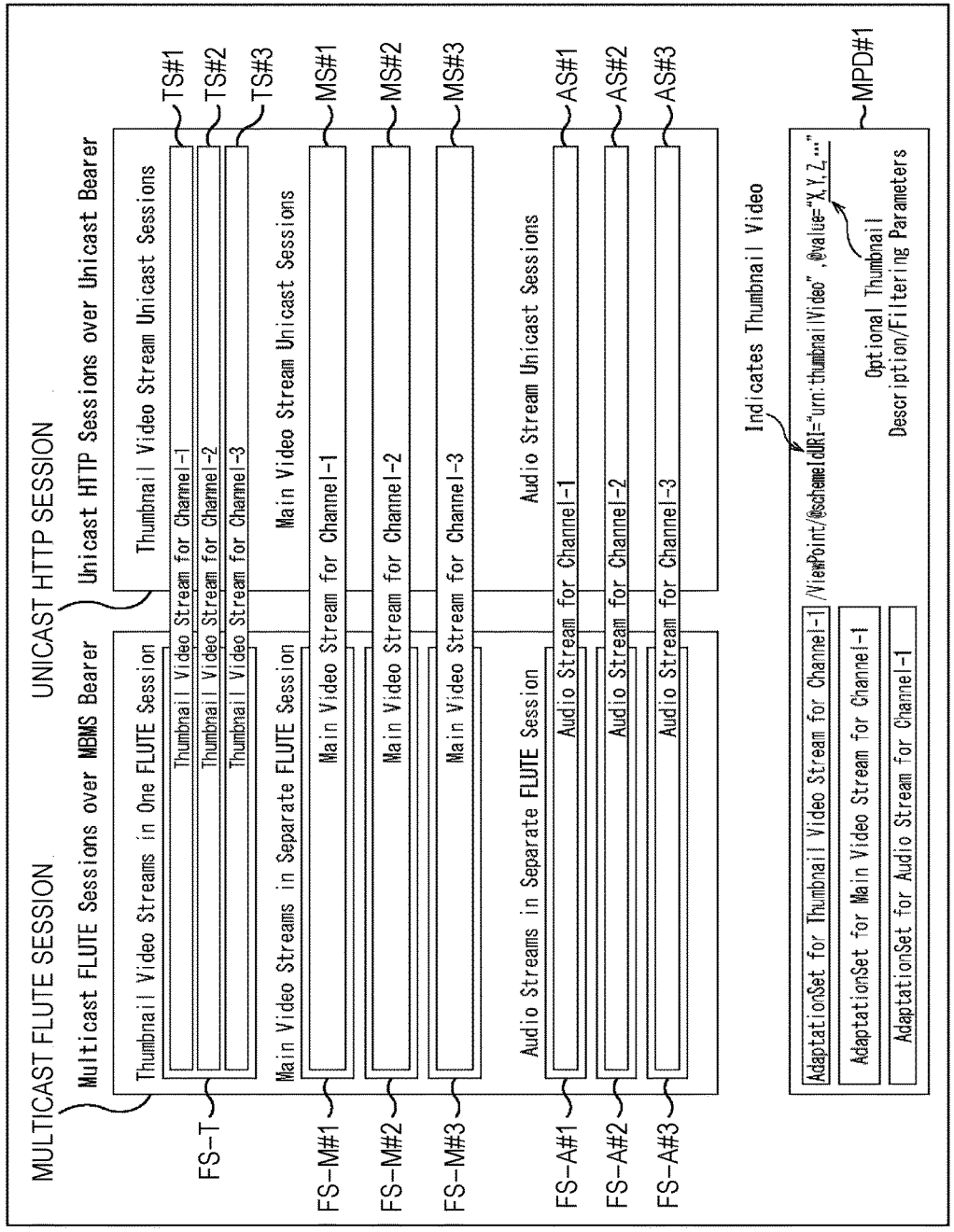
FIG. 27 is a view illustrating a fourth example of the method of delivering the content including the thumbnail video.
Figure 28:
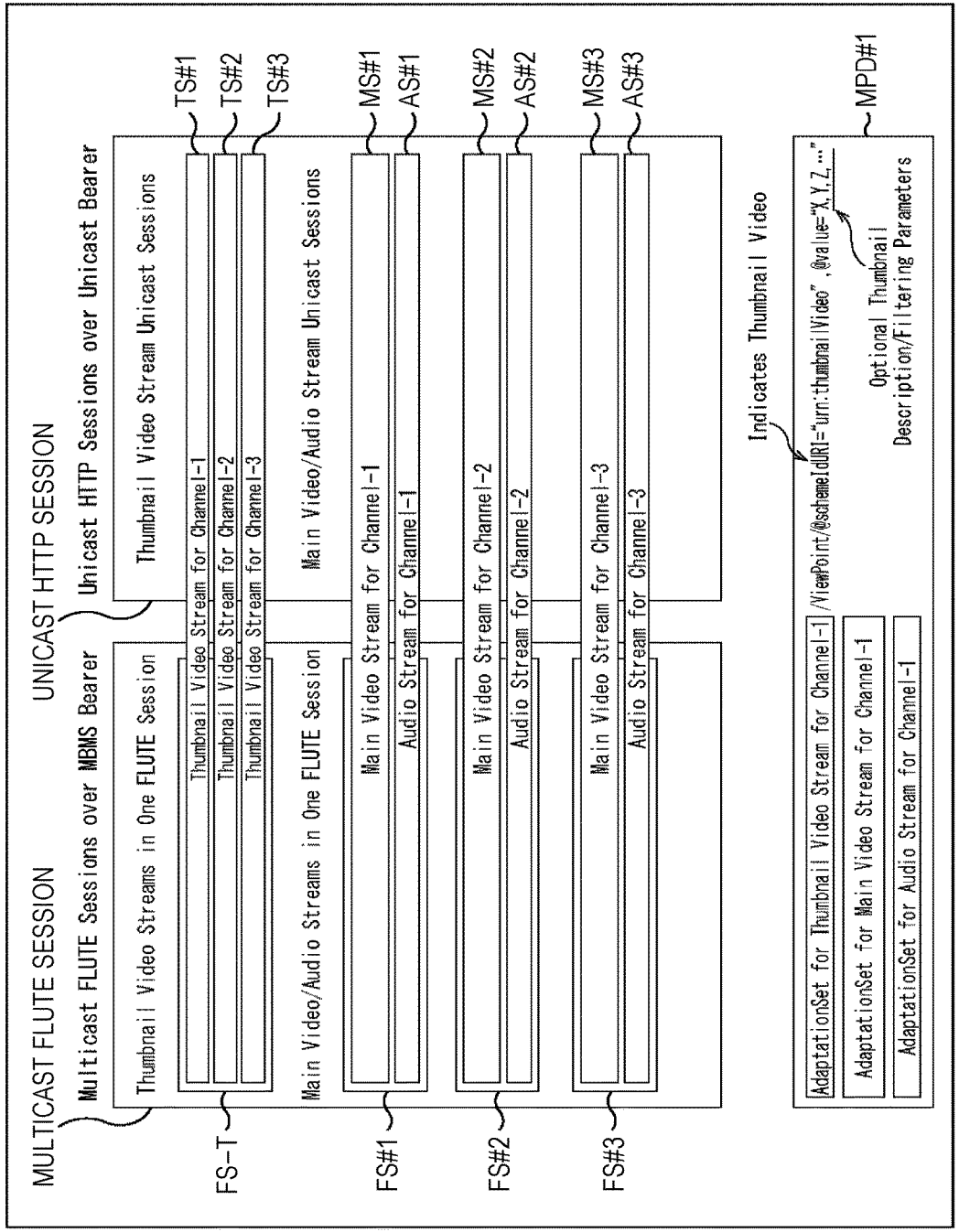
FIG. 28 is a view illustrating a fifth example of the method of delivering the content including the thumbnail video.
Figure 29:
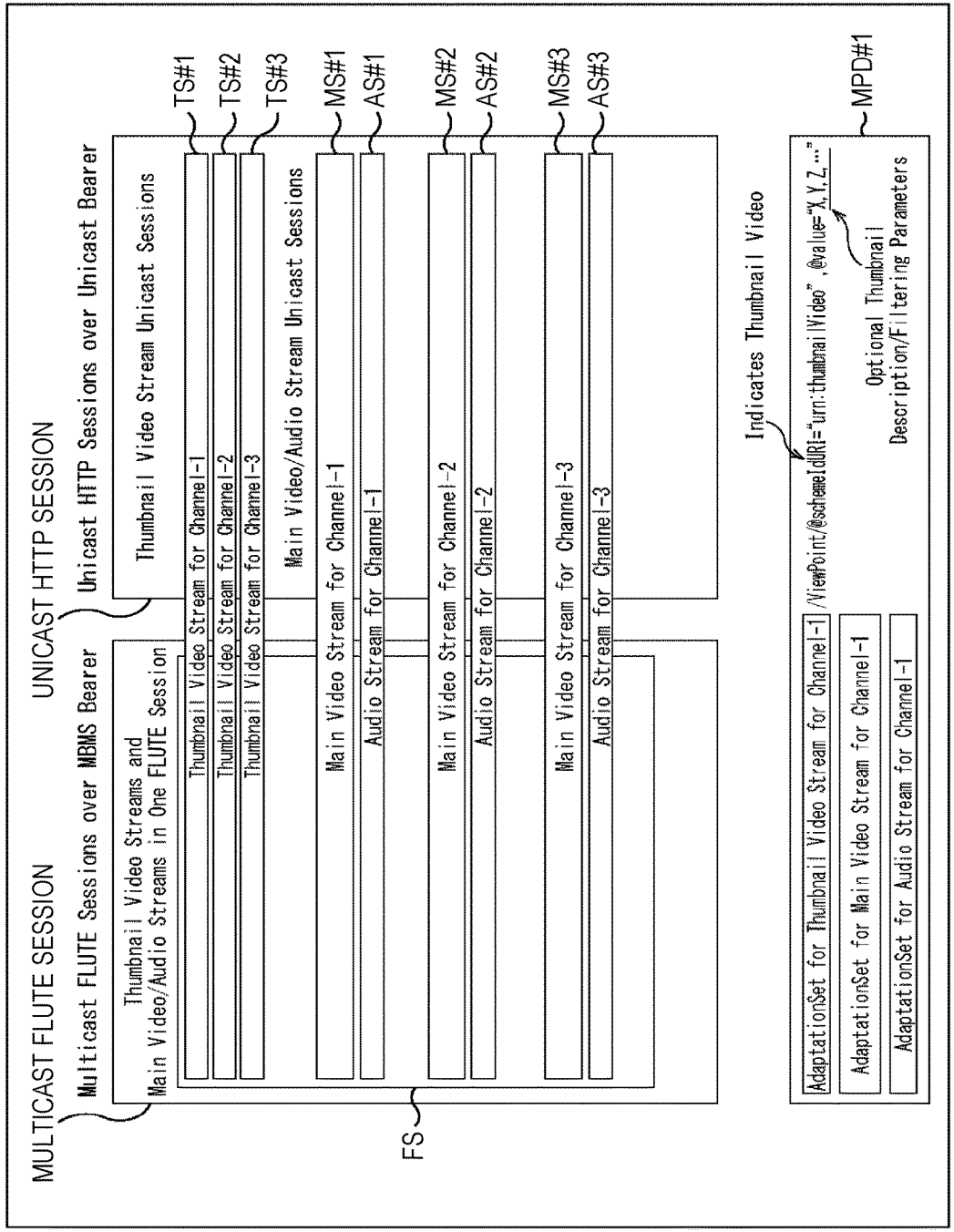
FIG. 29 is a view illustrating a sixth example of the method of delivering the content including the thumbnail video.

FIGS. 27, 28, and 29 are views illustrating examples of the method of delivering the content including the thumbnail video when the value attribute as the content description metadata is introduced into the MPD.

That is to say, FIGS. 27, 28, and 29 illustrate fourth, fifth, and sixth examples of the method of delivering the content including the thumbnail video, respectively.

In FIGS. 27 to 29, as in FIGS. 19 to 21, respectively, the main videos MS#1 to MS#3, audios AS#1 to AS#3, and thumbnail videos TM#1 to TM#3 of the channels ch#1 to ch#3 of the three broadcast stations (services) are delivered.

In FIGS. 27 to 29, as in FIGS. 19 to 21, respectively, AdaptationSet (element) of each of the main video MS#1, audio AS#1, and thumbnail video TM#1 is included in the MPD#1 of the content of the channel ch#1 and the ViewPoint/@schemeIdURI attribute in which the attribute value "urn:thumbnailVideo" is set, for example, as the thumbnail signaling information for signaling that (the video of) AdaptationSet is the thumbnail video is included in AdaptationSet of the thumbnail video TM#1 of the MPD#1.

Furthermore, in FIGS. 27 to 29, the value attribute (and information specifying the dictionary which defines the component of the value attribute) as the content description metadata is included in AdaptationSet of the thumbnail video TM#1 of the MPD#1 and this is different from the case in FIGS. 19 to 21.

As described above, FIGS. 27 to 29 are similar to FIGS. 19 to 21, respectively, except that the value attribute as the content description metadata is included in AdaptationSet of the thumbnail video TM#1 of the MPD #1 (this also applies to the MPD of the content of each of the channels ch#2 and ch#3), so that the description thereof is omitted.

<Display of Mosaic Screen in Client 13>

Figure 30:
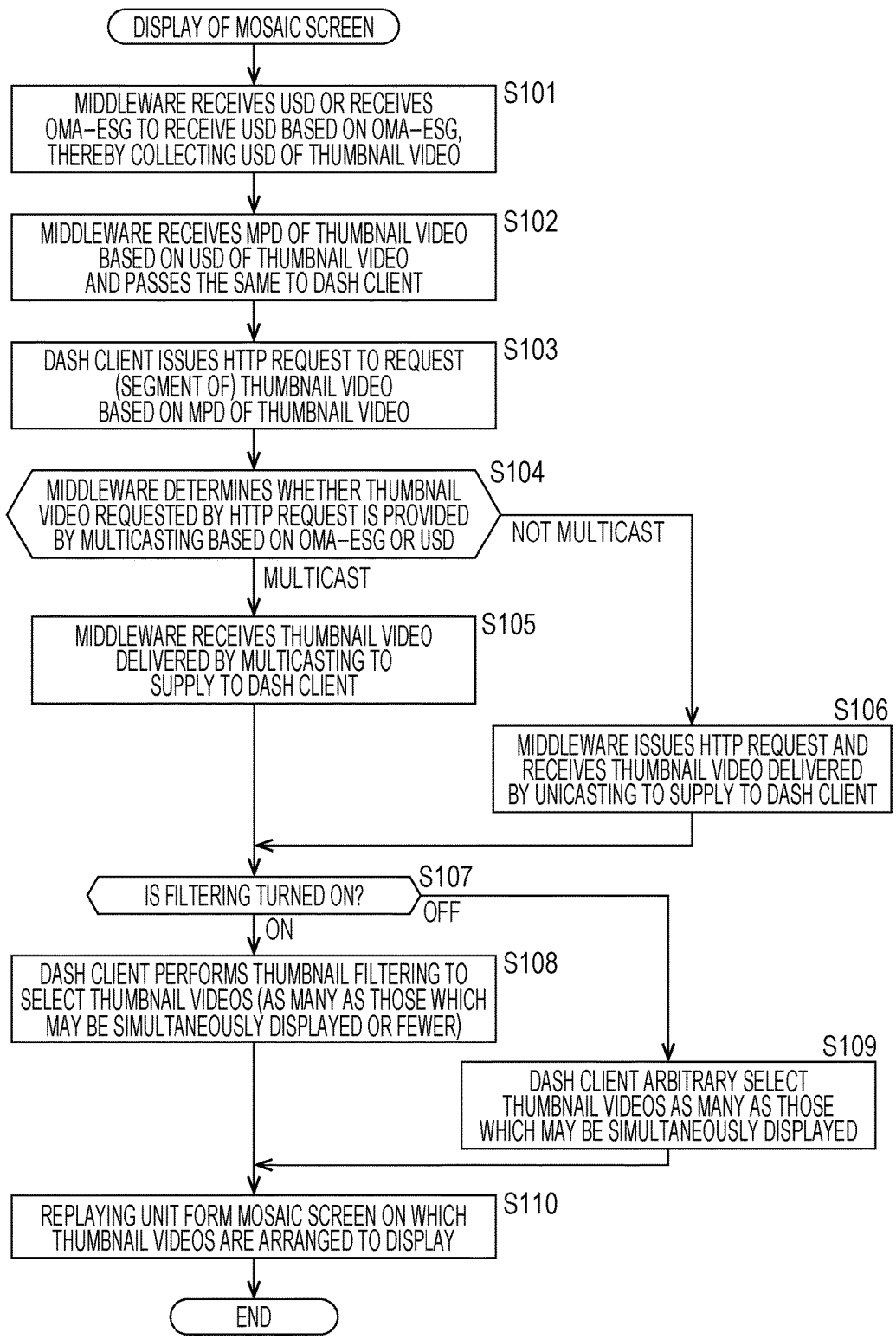
FIG. 30 is a flowchart illustrating an example of a process of displaying the mosaic screen in the client 13.

FIG. 30 is a flowchart illustrating an example of a process of displaying the mosaic screen in the client 13.

At step S101, the middleware 41 (FIG. 4) receives the USD, or receives the OMA-ESG to receive the USD based on the OMA-ESG, thereby collecting the USD of the thumbnail video, and the procedure shifts to step S102.

At step S102, the middleware 41 receives the MPD of the thumbnail video based on the USD of the thumbnail video and supplies (passes) the same to the DASH client 42 (FIG. 4), and the procedure shifts to step S103.

At step S103, the DASH client 42 issues the HTTP request to request (the segment of) the thumbnail video to the middleware 41 based on the MPD of the thumbnail video from the middleware 41, and the procedure shifts to step S104.

At step S104, the middleware 41 determines whether the thumbnail video requested by the HTTP request by the DASH client 42 is multicast-delivered based on the USD and OMA-ESG.

When it is determined that the thumbnail video is multicast-delivered at step S104, the procedure shifts to step S105, and the middleware 41 receives the thumbnail video which is multicast-delivered to supply to the DASH client 42, and the procedure shifts to step S107.

On the other hand, when it is determined that the thumbnail video is not multicast-delivered at step S104, the procedure shifts to step S106, and the middleware 41 issues the HTTP request from the DASH client 42 on the network 10. Furthermore, the middleware 41 receives the thumbnail video which is unicast-delivered from the channel server 11 (or aggregation server 12) according to the HTTP request to supply to the DASH client 42, and the procedure shifts to step S107.

At step S107, the receiving unit 40 (FIG. 4) determines whether the thumbnail filtering is turned on.

Herein, it is possible to set whether to turn on or off the thumbnail filtering, that is to say, whether to perform the thumbnail filtering by operating the client 13, for example.

When it is determined that the thumbnail filtering is turned on at step S107, the procedure shifts to step S108, and the DASH client 42 performs the thumbnail filtering by using the value attribute as the content description metadata described in the MPD of the thumbnail videos on the thumbnail video supplied from the middleware 41 and selects the thumbnail videos forming the mosaic screen out of the thumbnail videos supplied from the middleware 41 to supply to the replaying unit 43 (FIG. 4).

Herein, when the number of thumbnail videos selected by the thumbnail filtering is larger than the number of thumbnail videos which may be displayed on the mosaic screen, the client 13 may randomly select, for example, the thumbnail videos as many as (or fewer than) those which may be displayed on the mosaic screen out of the thumbnail videos selected by the thumbnail filtering, for example.

On the other hand, when it is determined that the thumbnail filtering is not turned on at step S107, the procedure shifts to step S109, and the DASH client 42 randomly selects, for example, the thumbnail videos as many as those which may be displayed on the mosaic screen out of the thumbnail videos supplied from the middleware 41 to supply to the replaying unit 43.

After steps S108 and S109, the procedure shifts to step S110, and the replaying unit 43 forms the mosaic screen on which the thumbnail videos from the DASH client 42 are arranged to display, and the process of displaying the mosaic screen is finished.

<Description of Computer to which this Technology is Applied>

A series of processes described above may be performed by hardware or by software. When a series of processes is performed by software, a program which forms the software is installed on a general-purpose computer and the like.

FIG. 31 illustrates a configuration example of one embodiment of the computer on which the program which executes a series of processes described above is installed.

The program may be recorded in advance in a hard disk 405 and a ROM 403 as a recording medium embedded in the computer.

Alternatively, the program may be stored (recorded) in a removable recording medium 411. Such removable recording medium 411 may be provided as so-called package software. Herein, the removable recording medium 411 includes a flexible disk, a Compact Disc Read Only Memory (CD-ROM), a Magneto Optical (MO) disk, a Digital Versatile Disc (DVD), a magnetic disk, a semiconductor memory and the like, for example.

Meanwhile, the program may be installed on the computer from the above-described removable recording medium 411 or may be downloaded to the computer through a communication network and a broadcast network to be installed on the embedded hard disk 405. That is to say, the program may be wirelessly transmitted from a downloading site to the computer through a satellite for digital satellite broadcasting or may be transmitted by wire to the computer through the network such as a Local Area Network (LAN) and the Internet, for example.

A Central Processing Unit (CPU) 402 is embedded in the computer and an input/output interface 410 is connected to the CPU 402 through a bus 401.

When an instruction is supplied by operation and the like of an input unit 407 by the user through the input/output interface 410, the CPU 402 executes the program stored in the Read Only Memory (ROM) 403 according to this. Alternatively, the CPU 402 loads the program stored in the hard disk 405 on a Random Access Memory (RAM) 404 to execute.

According to this, the CPU 402 performs the process according to the above-described flowchart or the process performed by the configuration of the above-described block diagram. Then, the CPU 402 outputs a processing result from an output unit 406 or transmits the same from a communicating unit 408 or records the same in the hard disk 405 through the input/output interface 410 for example, as needed.

Meanwhile, the input unit 407 is formed of a keyboard, a mouse, a microphone and the like. The output unit 406 is formed of a Liquid Crystal Display (LCD), a speaker and the like.

Herein, in this specification, the processes performed by the computer according to the program are not necessarily performed in chronological order along the order described as the flowchart. That is to say, the processes performed by the computer according to the program also include the processes executed in parallel or an independently executed process (for example, parallel process and process by an object).

The program may be processed by one computer (processor) or processed by a plurality of computers. Further, the program may be transmitted to a remote computer to be executed.

Furthermore, in this specification, the system is intended to mean assembly of a plurality of components (devices, modules (parts) and the like) and it does not matter whether all the components are in the same casing. Therefore, a plurality of devices stored in different casings connected through the network and one devices obtained by storing a plurality of modules in one casing are the systems.

Meanwhile, the embodiment of this technology is not limited to the above-described embodiment and various modifications may be made without departing from the scope of this technology.

For example, this technology may be configured as cloud computing in which a function is shared by a plurality of devices through the network to process together.

Each step described in the above-described flowchart may be executed by one device or by a plurality of devices in a shared manner.

Furthermore, when a plurality of processes is included in one step, a plurality of processes included in one step may be executed by one device or by a plurality of devices in a shared manner.

This technology may be applied to the delivery of content other than the DASH.

The effect described in this specification is illustrative only and is not limitative; there may also be another effect.

Meanwhile, this technology may also have a following configuration.

<1>
A transmitting device including:
a delivering unit which delivers metadata described by using an attribute and an attribute value, the metadata of content including
signaling information indicating that video is thumbnail video suitable for forming a mosaic screen and
the attribute indicating minimum buffer time required before replay of the content starts.
<2>
The transmitting device according to <1>, wherein
the metadata further includes one or more of a root element, the attribute indicating an operational profile which the metadata follows, and information of a segment obtained by dividing the content in a time direction.
<3>
The transmitting device according to <2>, wherein
the metadata is Media Presentation Description (MPD) of Moving Picture Experts Group-Dynamic Adaptive Streaming over HTTP (MPEG-DASH) and includes
an MPD element being the root element,
an MPD/@profile attribute being the attribute indicating the operational profile which the MPD follows,
an MPD/Period element being the information of the segment obtained by dividing the content in the time direction, and
an MPD/@minBufferTime attribute being the attribute indicating the minimum buffer time required before the replay of the content starts.
<4>
The transmitting device according to <3>, wherein
the MPD includes an MPD/Period/AdaptationSet/ViewPoint/@schemeIdURI attribute, an MPD/Period/AdaptationSet/Role/@schemeIdURI attribute, an MPD/Period/AdaptationSet/EssentialProperty/@schemeIdURI attribute, or an MPD/Period/AdaptationSet/SupplementalProperty/@schemeIdURI attribute in which information indicating that the content replay control of which is performed by the MPD is the thumbnail video is described as the attribute value as the signaling information.
<5>
The transmitting device according to <1>, wherein
the metadata further includes content description metadata being the attribute in which contents of the content are described.
<6>
The transmitting device according to <5>, wherein
the metadata further includes specification of a dictionary which defines a component of the content description metadata.
<7>
The transmitting device according to <5> or <6>, wherein
the content description metadata is used in filtering to select the thumbnail video used for forming the mosaic screen.
<8>
The transmitting device according to any one of <5> to <7>, wherein
the metadata is Media Presentation Description (MPD) of Moving Picture Experts Group-Dynamic Adaptive Streaming over HTTP (MPEG-DASH) and
the content description metadata is the attribute of an MPD/Period/AdaptationSet/ViewPoint element.
<9>
A transmitting method including a step of
delivering metadata described by using an attribute and an attribute value, the metadata of content including
signaling information indicating that video is thumbnail video suitable for forming a mosaic screen and
the attribute indicating minimum buffer time required before replay of the content starts.
<10>
A receiving device including:
a receiving unit which receives metadata described by using an attribute and an attribute value, the metadata of content including
signaling information indicating that video is thumbnail video suitable for forming a mosaic screen and
the attribute indicating minimum buffer time required before replay of the content starts.
<11>
The receiving device according <10>, wherein
the metadata further includes one or more of a root element, the attribute indicating an operational profile which the metadata follows, and information of a segment obtained by dividing the content in a time direction.
<12>
The receiving device according to <11>, wherein
the metadata is Media Presentation Description (MPD) of Moving Picture Experts Group-Dynamic Adaptive Streaming over HTTP (MPEG-DASH) and includes
an MPD element being the root element,
an MPD/@profile attribute being the attribute indicating the operational profile which the MPD follows,
an MPD/Period element being the information of the segment obtained by dividing the content in the time direction, and
an MPD/@minBufferTime attribute being the attribute indicating the minimum buffer time required before the replay of the content starts.

<13>
The receiving device according to <12>, wherein
the MPD includes an MPD/Period/AdaptationSet/ViewPoint/@schemeIdURI attribute, an MPD/Period/AdaptationSet/Role/@schemeIdURI attribute, an MPD/Period/AdaptationSet/EssentialProperty/@schemeIdURI attribute, or an MPD/Period/AdaptationSet/SupplementalProperty/@schemeIdURI attribute in which information indicating that the content replay control of which is performed by the MPD is the thumbnail video is described as the attribute value as the signaling information.
<14>
The receiving device according to <10>, wherein
the metadata further includes content description metadata being the attribute in which contents of the content are described.
<15>
The receiving device according to <14>, wherein
the metadata further includes specification of a dictionary which defines a component of the content description metadata.
<16>
The receiving device according to <14> or <15>, wherein
the content description metadata is used in filtering to select the thumbnail video used for forming the mosaic screen.
<17>
The receiving device according to any one of <14> to <16>, wherein
the metadata is Media Presentation Description (MPD) of Moving Picture Experts Group-Dynamic Adaptive Streaming over HTTP (MPEG-DASH) and
the content description metadata is the attribute of an MPD/Period/AdaptationSet/ViewPoint element.
<18>
A receiving method including:
a step of receiving metadata described by using an attribute and an attribute value, the metadata of content including
signaling information indicating that video is thumbnail video suitable for forming a mosaic screen and
the attribute indicating minimum buffer time required before replay of the content starts.

REFERENCE SIGNS LIST 11 channel server
12 aggregation server
13 client
14 NTP server
21 content management server
22 segment streamer
23 MPD server
31 stream aggregator
32 metadata generator
33 FLUTE streamer
34 multicast server
35 web server
410 receiving unit
41 middleware
42 DASH client
43 replaying unit
401 bus
402 CPU
403 ROM
404 RAM
405 hard disk
406 output unit
407 input unit
408 communicating unit
409 drive
140 input/output interface
411 removable recording medium

The invention claimed is:

1. A transmitting device comprising:
a memory configured to store metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS); and
circuitry configured to deliver the metadata including signaling information indicating that video is thumbnail video suitable for forming a mosaic screen, the signaling information being included in a MPD/Period/AdaptiveSet/ViewPoint@schemeIdURI attribute of the MPD or in a /@r7 serviceClass attribute in the USD,
wherein the MPD includes
an MPD element as a root element,
air MPD/@profiles attribute indicating an operational profile which the MPD follows,
an MPD/Period element being information of a segment obtained by dividing the content in the time direction, and
an MPD/@minBufferTime attribute indicating a minimum buffer time required before the replay of the content starts.

2. The transmitting device according to claim 1, wherein the MPD includes the MPD/Period/AdaptationSet/ViewPoint/@schemeIdURI attribute.

3. A transmitting method comprising:
delivering, by circuitry of a transmitting device, metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS),
the metadata including
signaling information indicating that video is thumbnail video suitable for forming a mosaic screen, the signaling information being included in a MPD/Period/AdaptationSet/ViewPoint@schemeIdURI attribute of the MPD or in a /@r7 serviceClass attribute in the USD,
wherein the MPD includes
an MPD element as a root element,
an MPD/@profiles attribute indicating an operational profile which the MPD follows,
an MPD/Period element being information of a segment obtained by dividing the content in the time direction, and
an MPD/@minBufferTime attribute indicating a minimum buffer time required before replay of the content starts.

4. A transmitting device comprising
a memory configured to store metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS); and
circuitry configured to deliver the metadata including signaling information indicating that video is thumbnail video suitable for forming a mosaic screen, the signaling information being included in a MPD/Period/
AdaptationSet/ViewPoint@schemeIdURI attribute of
the MPD or in a /@r7 ServiceClass attribute in the
USD, wherein
the metadata includes content description metadata being
an attribute in which contents of the content are
described, and
the MPD includes
an MPD element as a root element,
an MPD/@profiles attribute indicating an operational
profile which the MPD follows,
an MPD/Period element being information of a segment obtained by dividing the content in a time
direction, and
an MPD/@minBufferTime attribute indicating a minimum buffer time required before replay of the content starts.

5. The transmitting device according to claim 4, wherein the metadata further includes specification of a dictionary which defines a component of the content description metadata.

6. The transmitting device according to claim 5, wherein the content description metadata is used iii filtering to select the thumbnail video used for forming the mosaic screen.

7. The transmitting device according to claim 6, wherein the content description metadata is the attribute of an MPD/Period/AdaptationSet/ViewPoint element.

8. A transmitting method comprising:
delivering, by circuitry of a transmitting device, metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS), the metadata including
signaling information indicating that video is thumbnail video suitable for forming a mosaic screen, the signaling information being included in a MPD/Period/AdaptationSet/ViewPoint@schemeIdURI attribute of the MPD or in a /@r7 serviceClass attribute in the USD, wherein
the metadata includes content description metadata being an attribute in which contents of the content are described, and
the MPD includes
an MPD element as a root element,
an MPD/@profiles attribute indicating an operational profile which the MPD follows,
an MPD/Period element being information of a segment obtained by dividing the content in a time direction, and
an MPD/@minBufferTime attribute indicating a minimum buffer time required before replay of the content starts.

9. A receiving device comprising:
a memory configured to store metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS); and
circuitry configured to receive the metadata including signaling information indicating that video is thumbnail video suitable for forming, a mosaic screen, the signaling information being included in a MPD/Period/AdaptationSet/ViewPoint@schemeIdURI attribute of the MPD or in a /@r7 serviceClass attribute in the USD,
wherein the MPD includes
an MPD element as a root element,
an MPD/@profiles attribute indicating an operational profile which the MPD follows,
an MPD/Period element including information of a segment obtained by dividing the content in the time direction, and
an MPD/@minBufferTime attribute indicating a minimum buffer time required before replay of the content starts.

10. The receiving device according to claim 9, wherein the MPD includes the MPD/Period/AdaptationSet/ViewPoint/@schemeIdURI attribute.

11. A receiving method comprising:
receiving, by circuitry of a receiving device, metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS), the metadata including signaling information indicating that video is thumbnail video suitable for forming a mosaic screen, the signaling information being included in a MPD/Period/AdaptationSet/ViewPoint@schemeIdURI attribute of the MPD or in a /@r7 serviceClass attribute in the USD,
wherein the metadata includes
an MPD element as a root element,
an MPD/@profiles attribute indicating an operational profile which the MPD follows,
an MPD/Period element being information of a segment obtained by dividing the content in the time direction, and
an MPD/@minBufferTime attribute indicating a minimum buffer time required before replay of the content starts.

12. A receiving device comprising:
a memory configured to store metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS); and
circuitry configured to receive the metadata including signaling information indicating that video is thumbnail video suitable for forming a mosaic screen, the signaling information being included in a MPD/Period/AdaptationSet/ViewPoint@schemeIdURI attribute of the MPD or in a /@r7 serviceClass attribute in the USD, wherein
the metadata includes content description metadata being an attribute in which contents of the content are described, and
the MPD includes
an MPD element as a root element,
an MPD/@profiles attribute indicating an operational profile which the MPD follows,
an MPD/Period element being information of a segment obtained by dividing the content in a time direction, and
an MPD/@minBufferTime attribute indicating a minimum buffer time required before replay of the content starts.

13. The receiving device according to claim 12, wherein the metadata further includes specification of a dictionary which defines a component of the content description metadata.

14. The receiving device according to claim 13, wherein the content description metadata is used in filtering to select the thumbnail video used for forming the mosaic screen.

15. The receiving device according to claim 14, wherein the content description metadata is the attribute of an MPD/Period/AdaptationSet/ViewPoint element.

16. A receiving method comprising:
receiving, by circuitry, metadata of content, the metadata included in a Media Presentation Description (MPD) of Moving Picture Experts Group-Dynamic Adaptive Streaming over HTTP (MPEG-DASH) and a User Service Description (USD) of Multimedia Broadcast Multicast Service (MBMS), the metadata including signaling information indicating that video is thumbnail video suitable for forming a mosaic screen, the signaling information being included in a MPD/Period/AdaptationSet/ViewPoint@schemeIdURI attribute of the MPD or in a /@r7 serviceClass attribute in the USD, wherein
the metadata includes content description metadata being the attribute in which contents of the content are described, and
the MPD includes
    MPD element as a root element,
    an MPD/@profiles attribute indicating an operational profile which the MPD follows,
    an MPD/Period element being information of a segment obtained by dividing the content in a time direction, and
    an MPD/@minBufferTime attribute indicating a minimum buffer time required before replay of the content starts.

* * * * *